US007061903B2

(12) United States Patent
Higuchi

(10) Patent No.: US 7,061,903 B2
(45) Date of Patent: Jun. 13, 2006

(54) MEDIA COMMUNICATION SYSTEM, AND TERMINAL APPARATUS AND SIGNAL CONVERSION APPARATUS IN SAID SYSTEM

(75) Inventor: Mamoru Higuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 755 days.

(21) Appl. No.: 09/809,919

(22) Filed: Mar. 16, 2001

(65) Prior Publication Data

US 2002/0051463 A1 May 2, 2002

(30) Foreign Application Priority Data

Oct. 31, 2000 (JP) .................................... 2000-332404

(51) Int. Cl.
*H04L 12/66* (2006.01)

(52) U.S. Cl. ...................................... 370/352; 370/475
(58) Field of Classification Search ................ 370/352, 370/353, 354, 355, 356, 395.52, 395.2, 395.3, 370/395.31, 401, 463, 466, 474, 475
See application file for complete search history.

(56) References Cited

U.S. PATENT DOCUMENTS

| 6,061,798 | A | * | 5/2000 | Coley et al. ................. 713/201 |
| 6,243,379 | B1 | * | 6/2001 | Veerina et al. ............... 370/389 |
| 6,487,602 | B1 | * | 11/2002 | Thakker ....................... 709/230 |
| 6,515,974 | B1 | * | 2/2003 | Inoue et al. ................... 370/331 |
| 6,574,229 | B1 | * | 6/2003 | Takahashi et al. ........... 370/400 |
| 6,643,284 | B1 | * | 11/2003 | Inoue et al. .................. 370/352 |
| 6,711,159 | B1 | * | 3/2004 | Grabelsky et al. ........... 370/353 |
| 6,829,232 | B1 | * | 12/2004 | Takeda et al. ................ 370/352 |

FOREIGN PATENT DOCUMENTS

WO 00/60785 10/2000

OTHER PUBLICATIONS

Suben, et al., "Toward The PSTN/Internet Inter-Networking; Media Device Control Protocol; Version 0.3; Draft-Suben-Megaco-MDCP-01. TXT" Internet Engineering Task Force: XP002209264, Feb. 9, 1999 pp. 1–39.
Thernelius, et al., "SIP Firewall Solution" IETF Internet Draft, XP002228856: Jul. 2000; pp. 1–16.
Thom, "The Multimedia Communications Standard for Local Area Networks" IEEE Communications Magazine; vol. 34, No. 12: Dec. 1, 1996 pp. 52–56: XP000636454: ISSN: 0163–6804.
Mercer, et al., "H.323 Firewall Control Interface (HFCI)" IETF Internet Draft, Jun. 6, 2000: XP002197776: pp. 1–15.

* cited by examiner

*Primary Examiner*—Kwang Bin Yao
(74) *Attorney, Agent, or Firm*—Katten Muchin Rosenman LLP

(57) ABSTRACT

Disclosed is a media communication system in which communication of media such as sound, image and the like is performed between first and second terminals, each of which is constructed so as to be capable of IP communication, via an IP network. The system includes an IP packetizing unit for IP-packetizing and sending, to the IP network, a media signal sent from the first terminal, and for converting an IP packet received from the IP network to a media signal and sending the media signal to the first terminal, and a media signal transmitting unit for connecting a media/signal converter, which is provided within the first terminal, to the IP packetizing unit to transmit a media signal.

5 Claims, 20 Drawing Sheets

MEDIA COMMUNICATION SYSTEM, AND TERMINAL APPARATUS AND SIGNAL CONVERSION APPARATUS IN SAID SYSTEM

BACKGROUND OF THE INVENTION

This invention relates to a media communication system, a terminal apparatus and a signal conversion apparatus used in this system. In particularly, the invention relates to a media communication system for communication of media such as voice and images via an IP network between terminals constructed so as to be capable of IP communication, as well as to a terminal apparatus and signal conversion apparatus used in this system.

VoIP (Voice over IP) technology through which telephone communication is implemented by IP communication has been developed and has reached the product phase in recent years. What characterizes VoIP technology is the fact that a voice signal is transmitted via IP communication. By using IP communication to control a terminal that has been connected to an IP communication network, the provision of more flexible services can be expected. In order to realize VoIP communication, a protocol stipulated by ITU-T Recommendation H.323 has been developed and is now in wide use. In recent years, moreover, consideration has been given to controlling the connection of calls by SIP (Session Initiation Protocol). Study of this protocol is being forwarded with a view to implementation.

In order to maintain the quality of voice when voice is transmitted using IP communication, variations in transmission delay of the IP packets that transport voice must be not be allowed to exceed a certain fixed value, and techniques for maintaining the network conditions of IP communication for this purpose are being studied widely. Voice communication at a problem-free quality is feasible even at the present time if the communication path for carrying out IP communication has a bandwidth sufficiently. If this is not the case, however, the state of the art is such that voice quality cannot be maintained satisfactorily. Investigations and research in this area are being conducted aggressively at the present time.

In communication systems in which wireless communication is used up to the terminal, as in cellular telephone systems, the data transfer bandwidth over such wireless segments of the communication path is not large. As a consequence, if communication traffic by way of IP is increased for the purpose of achieving more economical communication, the IP communication traffic in the wireless segments increases and so does delay. In an instances where IP communication is performed using an ordinary telephone line, an increase in traffic will make it difficult to carry out high-quality voice communication unless sufficient bandwidth is provided for the IP network.

Thus, there is keen demand for a method or system that will assure voice quality by reducing delays in the transmission of voice IP packets even when there is an increase in IP communication traffic.

The present invention seeks to solve the above-mentioned problem by performing media communication such as voice communication through conventional communication techniques without relying upon IP communication over segments of the transmission path where sufficient bandwidth cannot be acquired. As a result, control of a terminal can be carried out by IP communication while assuring the quality of voice, and it is possible to realize a media communication system that provides the flexible service that is the characterizing feature of VoIP communication. It should be noted that although the present invention is applied to general media communication inclusive of voice communication, the invention will be described with regard to voice communication because limiting the discussion to voice communication will better facilitate an understanding of the invention. However, since voice communication is but one form of media communication, it will readily be understood that the invention can be expanded to cover other media communication. In other words, the present invention is not limited to voice communication.

FIG. 16 is a block diagram showing the configuration of a network for implementing ordinary VoIP communication according to the prior art. Here a VoIP terminal 101 (VoIP terminal A) and a VoIP terminal 102 (VoIP terminal B) are connected to an IP network 130. The VoIP terminal 101 has a control unit 120 for performing connection control and media control, a voice/signal converter 122 for performing a conversion between voice and an electric signal, and an IP packetizing unit 124 having a function for placing a voice signal in an IP packet. The VoIP terminal 101 further includes an IP interface 126 for transmitting a control-signal IP packet sent and received under the control of the control unit 120, and for receiving a control-signal IP packet from the IP network 130, and an IP interface 128 for transmitting a voice-signal IP packet to the IP network 130 and receiving a voice-signal IP packet from the IP network 130. The VoIP terminal 102 has a structure similar to that of the VoIP terminal 101.

A procedure for connecting the call of a VoIP terminal generally is carried out in phases as shown in FIG. 17. The procedure, which is described in Chapter 8 of ITU-T Recommendation H.323 stipulating the H.323 procedure, can be divided into five phases, namely Phase A, Phase B, . . . , Phase E. Each phase will now be described with regard to a case where voice is communicated upon connecting terminals A and B together.

1. Phase A: Call Setup Phase

This phase is a procedure through which agreement is obtained for the purpose of setting up a call between the two terminals. If the VoIP terminal 101, which is the originating terminal, is operated by a user to issue a call, then the VoIP terminal 101 sends a Setup message, which is for setting up the call, to the VoIP terminal 102, and the latter responds to receipt of the Setup message by deciding whether or not to set up the call. If the call is set up, the VoIP terminal 102 notifies the VoIP terminal 101 of call set-up by a Connect message and reports also the address (connect address) that will be necessary in the ensuing Phase B. The details of the procedure of Phase A will now be described with reference to FIG. 18. The latter is an example that makes use of the H.323 protocol.

First, a connection controller 141 in the control unit 120 of VoIP terminal 101 determines the destination using the IP address of an IP interface 127 of a control unit 121 in the VoIP terminal 102, edits an IP packet that contains a message (Set Up message 301) for requesting call set-up and requests the IP interface 126 to transmit this IP packet. The IP interface 126 transmits the IP packet to the IP interface 127 of VoIP terminal 102. In this case, it is required that the control unit 120 know the IP address of the VoIP terminal B. In order to simplify the description, however, it will be assumed that the control unit 120 already knows this IP address. A method of acquiring an IP address when the IP address is unknown is well known in the art and is described also in the H.323 documentation.

Upon receiving the Set-Up message 301 from the VoIP terminal 101, the IP interface 127 of VoIP terminal 102 delivers this request message to a connection controller 143 in the control unit 121. The connection controller 143 determines whether a call can be connected in response to the Set-Up message 301 and, if it determines that the call can be connected, sends back an answer message (Connect message 302) to the VoIP terminal 101. The Connect message 302 reports the IP address and port number to be contacted by the VoIP terminal 101 in Phase B. In the example of FIG. 16, the contact address is constituted by the IP address and port number necessary to communicate with a media controller 144 that exercises control in Phase B. Accordingly, the IP address of the IP interface 127 and the port number for selecting the media controller 144 are reported to the VoIP terminal 101 as the contact address. Upon receiving the above-mentioned answer message, the VoIP terminal 101 in effect agrees with the other terminal to connect the call and delivers the privilege for subsequent control to a media controller 142 (Start 303 in FIG. 18) together with the IP address and port number of the VoIP terminal 102 to be contacted.

2. Phase B: Initial Communication and Capability Exchange

The media controller 142 of VoIP terminal 101 edits information necessary for voice communication, the information including (1) the voice encoding scheme of the VoIP terminal 101, (2) the IP address of the IP interface 128 that sends and receives voice packets, and (3) the port number of the IP packetizing unit 124, and sends this information (Open Logical Channel message 304) to the destination indicated by the IP address and port number of the VoIP terminal 102 that were reported through the procedure of Phase A. Upon receiving this message, the media controller 144 of control unit 121 in VoIP terminal 102 determines whether the voice encoding scheme on the side of VoIP terminal 102 matches the requested encoding scheme. If the schemes match and voice communication is possible, the media controller 144 edits information necessary for voice communication, the information including the IP address of an IP interface 129 of VoIP terminal 102 that sends and receives voice packets, and a port number for selecting a voice IP packetizing unit 125, and sends this information to the VoIP terminal 101 (Open Logical Channel Ack 306). As a result of these operations, information for communicating voice between the VoIP terminals 101, 102 is obtained on both sides.

In a case where SIP (Session Initiation Protocol) is used to make the connection instead of the H.323 protocol, the sequence becomes as shown in FIG. 19. In this case, Phases A and B are consolidated and expressed by a single message. Specifically, the connection controller 141 of VoIP terminal 101 queries the media controller 142 regarding the conditions usable in media communication (401) and, as a result, information necessary for media communication, namely the voice encoding scheme of the VoIP terminal 101, the IP address of the IP packetizing unit 124 and the port number, etc., is obtained. The connection controller 141 sends the call set-up request, which is inclusive of this information, to the connection controller 143 of VoIP terminal 102 (Invite message 402). Upon receiving the Invite message 402, the VoIP terminal 102 determines whether the connection can be established and, if the connection can be established, reports the conditions of VoIP terminal 101 to the media controller 144 of VoIP terminal 102, acquires the conditions (403) on the side of VoIP terminal 102 from the media controller 144 and sends this information to the VoIP terminal 101 by an OK message (404). In order to verify receipt of the OK message, the VoIP terminal 101 transmits an ACK message to the VoIP terminal 102 (416).

The connection controller 141 of VoIP terminal 101 delivers the information of the OK message to the media controller 142. As a result of these operations, information for communicating media between the VoIP terminals 101, 102 is obtained on both sides.

3. Phase C: Establishment of Audiovisual Communication

The media controllers 142, 144 of the control units in both VoIP terminals notify the IP packetizing units 124, 125 of the destination IP addresses and port numbers, which are for sending and receiving voice packets, acquired through the above-described procedure, and the IP packetizing units 124, 125 start sending the voice signal using the reported IP addresses and port numbers as the destinations. Start messages 305, 307 in FIG. 18 and Start messages 407, 408 in FIG. 19 correspond to the parts of the procedure set forth above.

The voice packet arrives at the IP interface 129 having the set IP address of the destination and the packet is input to the receiving-side IP packetizing unit 125 selected by the specified port number. Next, the IP packetizing unit 125 converts the IP packet to a voice signal and a voice/signal converter 123 converts the voice signal to voice and outputs the same. The voice signal in the opposite direction is transmitted in a similar manner, whereby voice communication becomes possible (308 in FIG. 18 and 409 in FIG. 19).

4. Phase D: Call Service

By changing the IP address of the communicating party to another IP address during a call, it is possible with the communication established in Phase C to change the destination of the connection. Services such as third-party conversion and call transfer are implemented using this function.

5. Phase E: Call Termination

In order to release a connected call, the connection controller 141 on the calling side sends a release request message (Release message 309 in FIG. 18 and Bye message 410 in FIG. 19) to the VoIP terminal 102 on the called side and instructs the IP packetizing unit 124 to terminate the sending of voice (313, 314 in FIG. 18 and 414, 415 in FIG. 19). Upon receiving the release request message, the connection controller 143 of the VoIP terminal 102 instructs the IP packetizing unit 125 to halt the sending of voice (311, 312 in FIG. 18 and 412, 413 in FIG. 19) and sends a message to answer the release request (Release Ack 310 in FIG. 18 and OK 411 in FIG. 19). As a result, the resources that were being used in the connection of the call are released and the call can be disconnected.

If the VoIP terminal 101 that requested release cannot receive Release Ack 310 within a fixed period of time, this terminal resends the release request message. This makes it possible to release the call connection reliably even in cases where the message has been lost.

FIG. 20 is a diagram showing the network configuration of a conventional All-IP architecture inclusive of a wireless transmission segment. Here a mobile network inclusive of a wireless segment is constructed by a cellular telephone terminal 51, which is a mobile station, a wireless base station 52, an SGSN (Serving GPRS Support Node) 53 and a GGSN (Gateway GPRS Support Node) 54. GPRS (General Packet Radio Service) is a function having 3GPP architecture that provides the mobile subscriber with a packet-data service. SGSN 53 and GGSN 54 are both nodes having a gateway function for a 3GPP core network furnished with a packet service. SGSN 53 is provided on the side of the base station, GGSN 54 is provided on the side of an IP network 55 and both send and receive packets in accordance with the GTP protocol.

Connected to the IP network 55 in addition to the GGSN 54 are an SIP proxy server 56, which performs connection control, and an IP telephone (IP Tel) 57. Furthermore, a PSTN (Public Switched Telephone Network) 59 is connected to the IP network 55 via a media gateway (MG) 58.

In response to a request from a user to originate a call, the cellular telephone terminal 51 creates an IP packet inclusive of an invite message in accordance with SIP/TCP/IP and sends the packet to the SIP proxy server 56 via the wireless base station 52, SGSN 53, GGSN 54 and IP network 55 in the order mentioned. The SIP proxy server 56 obtains the IP address of the communication destination based upon information concerning the communicating party contained in the invite message and sends the invite message to this communication destination. If connection to the cellular telephone terminal 51 is possible, the communication destination sends the IP packet, which includes an OK message, to the cellular telephone terminal 51 by way of the SIP proxy server 56. The cellular telephone terminal 51 thenceforth places voice in an IP packet in accordance with RTP/UDP/IP and transmits this IP packet to the communicating party via the wireless base station 52, SGSN 53, GGSN 54 and IP network 55 in the order mentioned. The voice packet from the communicating party is received, returned to a voice signal and output. It should be noted that RTP stands for Real-time Transport Protocol.

Thus, in conventional VoIP communication, the VoIP terminal is connected to the server (the SIP proxy server in FIG. 20) and control signals are exchanged by the server and terminal to effect the connection between them. In this case, the server need only be connected to the IP network and therefore connection control can be carried out utilizing any server that does not depend upon a telephone company. This is advantageous in that flexible service can be provided.

In summation, the following advantages (1) to (3) are obtained in accordance with VoIP communication of the conventional All-IP architecture:

(1) End-to-end control is possible. Service can be implemented by the functionality of a terminal or by the functionality of a node (server) that is independent of a network.

(2) Because end-to-end control can be carried out, a mechanism for service implementation can be constructed independently of an IP network. Further, functions for implementing service can be utilized in common by various communication networks and, hence, the cost of service implementation can be reduced.

(3) If IP data communication increases, so does data traffic and a strategy is instituted to increase the capacity of the IP network to cope with this. If the capacity of the IP network is enlarged, the amount of communication resources for special communication such as voice communication declines in comparison with the capacity possessed by the IP network and it becomes unnecessary to set aside resources.

Nevertheless, VoIP communication of the conventional All-IP architecture has certain problems, which are as follows:

(1) Human beings are sensitive to voice quality. It is necessary, therefore, to provide a high IP-communication quality in order to avoid a decline in voice quality as caused by delay of IP packets. With the prior art, however, measures for dealing with delay of IP packets are unsatisfactory and high-quality communication of voice cannot be achieved. A decline in quality due to delay is great especially when there is a segment in the communication path that does not possess sufficient bandwidth for data transmission.

(2) An IP packet is composed of a header and payload, and overhead resulting from the header is large. The problem that arises is that efficient communication cannot be carried out in the case of voice communication where the amount of data in one IP packet is small. More specifically, with voice communication, it is necessary to send IP packets in short intervals (e.g., 20 ms) and therefore sophisticated functionality is needed to compress the header. This is not easy to furnish.

(3) In instances where radio communication is used, as in the case of a cellular telephone, the data transmission bandwidth over the wireless segment of the transmission path is small. Delay over such a segment is large and degrades voice quality. In networks that have wireless segments, therefore, sophisticated techniques are required to implement IP communication with high quality. This is not easy.

(4) In order to raise the voice quality of a cellular telephone, the signal is transmitted upon being separated into a portion that is important for voice and a portion of lesser importance. If the same method is employed with communication of IP packets, however, the amount of data contained in one IP packet diminishes even further and efficient transmission is difficult to accomplish.

(5) As mentioned above, it is necessary to send IP packets at small intervals (e.g., 20 ms) in order to transmit voice using IP packets. As a consequence, the number of IP packets sent over a fixed period of time is large and the routers that transfer the IP packets require a high processing capability. In particular, when a firewall is used to maintain security, processing for verifying all voice IP packets is required. The result is an increase in amount of processing, making a high-performance firewall necessary. This raises cost.

(6) Though VoIP devices have proliferated, conventional voice telephone equipment is still prevalent by far. This means that it is necessary to utilize conventional voice telephone facilities efficiently. However, such facilities cannot be exploited satisfactorily with the conventional All-IP architecture.

SUMMARY OF THE INVENTION

Accordingly, an object of the present invention is to avoid a decline in voice quality as caused by delay of IP packets.

Another object of the present invention is to avoid a decline in voice quality even in a case where a transmission path includes a segment, e.g., a wireless segment, that does not have a sufficient data transmission bandwidth.

Another object of the present invention is to prevent a decline in voice quality and make it possible to provide flexible service.

A further object of the present invention is to make it possible to set up calls and provide service through handling that is entirely the same as that of a conventional VoIP terminal.

A further object of the present invention is to dispense with a highly sophisticated function for compressing headers for the purpose of improving upon the overhead of headers.

Yet another object of the present invention is to dispense with processing for verifying voice IP packets in a firewall.

Another object of the present invention is to utilize conventional voice communication equipments effectively.

According to a first aspect of the present invention, there is provided a media communication system for performing media communication between first and second terminals, each of which is constructed so as to be capable of IP communication, via an IP network, the system comprising: (1) an IP packetizing unit for IP-packetizing and sending, to the IP network, a media signal sent from the first terminal, and for converting an IP packet received from the IP network to a media signal and sending the media signal to the first terminal, and (2) a media signal transmitting unit for connecting a media/signal converter, which is provided within the first terminal, to the IP packetizing unit, and for transmitting a media signal. The first terminal has, in addition to the media/signal converter for generating a media signal and receiving a media signal from the IP packetizing unit, a controller for controlling connection to the second terminal and for controlling sending/receiving of a media signal. When a call is generated, the controller (1) performs control in such a manner that the IP packetizing unit operates as its own IP packetizing unit and (2) controls the media signal transmitting unit to connect the media/signal converter and the IP packetizing unit so as to make transmission of a media signal possible. Upon completion of the connection control, the controller (3) sends and receives media signals to and from the second terminal via the media/signal converter, the media signal transmitting unit, the IP packetizing unit and the IP network.

In accordance with the first aspect of the present invention, the IP-packetization of voice takes place not in the terminal but in the IP packetizing unit disposed in close proximity to the IP network. As a result, VoIP communication with little degradation of voice quality is possible. Moreover, it is possible to carry out end-to-end control, which is one of the merits of VoIP communication, thereby enabling the provision of flexible service.

Further, in accordance with the first aspect of the present invention, even if there is a segment of the communication path that does not have sufficient data transmission bandwidth, e.g., a wireless segment, voice is transmitted over this segment as it is without being converted to a voice IP packet. As a result, delay of IP packets can be reduced and a decline in voice quality can be avoided. In addition, since delay of IP packets can be reduced, the size of overhead in the header of an IP packet does not present a problem and it is possible to dispense with a highly sophisticated header compression function.

Further, in accordance with the first aspect of the present invention, voice is transmitted as it is using a public network or mobile network without relying upon IP packetizing over segments that do not possess sufficient data transmission bandwidth. As a result, conventional voice telephone equipment can be utilized effectively.

Further, since a terminal in the present invention can be provided with an interface exactly the same as that of the conventional VoIP terminal, it is possible to set up calls and provide service through handling that is exactly the same as that of the usual VoIP terminal.

According to a second aspect of the present invention, there is provided a media communication system for performing media communication between first and second terminals, each of which is constructed so as to be capable of IP communication, via an IP network, the system comprising: (1) a public IP network to which the first terminal is connected; (2) a private VoIP network (intracorporate IP network) to which the second terminal is connected and which is capable of IP media communication by an extension; (3) a firewall provided between the public IP network and the intracorporate IP network; (4) an IP packetizing unit for IP-packetizing and sending, to the intracorporate IP network, a media signal sent from the first terminal, and for converting an IP packet received from the intracorporate IP network to a media signal and sending the media signal to the first terminal; and (5) a media signal transmitting unit for connecting a media/signal converter, which is provided within the first terminal, to the IP packetizing unit, and for transmitting a media signal.

The first terminal has, in addition to the media/signal converter for generating a media signal and receiving a media signal from the IP packing unit, a controller for controlling connection to the second terminal and for controlling sending/receiving of a media signal. When a call is generated, the controller (1) performs control in such a manner that the IP packetizing unit operates as its own IP packetizing unit and (2) controls the media signal transmitting unit to connect the media/signal converter and the IP packetizing unit so as to make transmission of a media signal possible. Upon completion of the connection control, the controller (3) sends and receives media signals to and from the second terminal via the media/signal converter, the media signal transmitting unit, the IP packetizing unit and the intracorporate IP network.

In accordance with the second aspect of the present invention, it is possible for an enterprise having a VoIP-based extension to communicate just as if a connection has been made to the extension from the outside using an existing telephone network. This makes possible the implementation of highly effective means for use as intracorporate communication means.

According to a third aspect of the present invention, there is provided a media communication system for performing media communication between first and second terminals, each of which is constructed so as to be capable of IP communication, via an IP network, the system comprising: (1) an intracorporate, closed internal IP network (such as intracorporate IP network) to which the first terminal is connected and which is capable of IP media communication; (2) a public IP network to which the second terminal is connected; (3) a firewall provided between the intracorporate IP network and the external IP network (public IP network); and (4) IP-packet relay means provided between the intracorporate IP network and public IP network for relaying only IP packets of a media signal that bypasses the firewall. The first terminal has an IP packetizing unit for IP-packetizing a media signal and sending it to the internal IP network, and for converting an IP packet received from the internal network to a media signal; and a controller for controlling connection to the second terminal and for controlling sending/receiving of a media signal when a call is generated. When a call is generated, the controller (1) performs control via the intracorporate IP network, firewall and public IP network in such a manner that the IP-packet relay means operates as its own relay means and (2) controls connection via the intracorporate IP network, IP-packet relay means and public IP network in such a manner that a media signal is capable of being transmitted. Upon completion of connection control, the controller (3) sends and receives media signals to and from the second terminal via the intracorporate IP network, IP-packet relay means and public IP network.

In accordance with the third aspect of the present invention, it is possible to dispense with processing for verifying voice IP packets at the firewall. This makes it possible to reduce the amount of firewall processing, to dispense with the need to provide the firewall with sophisticated functionality and to hold down cost.

According to a fourth aspect of the present invention, there is provided a signal conversion apparatus provided in a radio base-station facility and connected to an asynchronous communication network (e.g., an IP network) which is controled by the terminal using the control signals sent from the terminal. The signal conversion apparatus comprises: (1) first conversion means for converting a synchronous voice signal, which the base station has received from a mobile station via a radio channel, to an asynchronous voice signal directed to a destination that has been set; (2) first sending means for sending the asynchronous voice signal obtained by the conversion to the asynchronous communication network; (3) second conversion means for receiving an asynchronous voice signal from the set destination via the asynchronous communication network and converting this signal to a synchronous voice signal; and (4) second sending means for sending the synchronous voice signal obtained by the conversion to the radio base station in such a manner that this signal will be transmitted to the mobile station via the radio channel.

According to a fifth aspect of the present invention, there is provided a terminal apparatus in a media communication system for sending and receiving media signals between terminals via an IP packetizing unit for IP-packetizing a media signal and sending it to an IP network and for converting an IP packet received from the IP network to a media signal, a media signal transmitting unit for transmitting a media signal between a terminal and the IP packetizing unit, and the IP network, the terminal apparatus comprising: (1) a media/signal converter for generating and sending a media signal and receiving a media signal from the IP packetizing unit via the media signal transmitting unit, and (2) a controller which, when a call is generated, is for performing control in such a manner that the IP packetizing unit operates as its own IP packetizing unit and for controlling the media signal transmitting unit to connect the media/signal converter and the IP packetizing unit.

In accordance with the fourth and fifth aspects of the present invention, it is possible to provide a terminal apparatus and a signal conversion apparatus that can be used in the first to third aspects of the present invention.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS (A) Overview of the Invention

Media Communication According to the Invention

Figure 1:
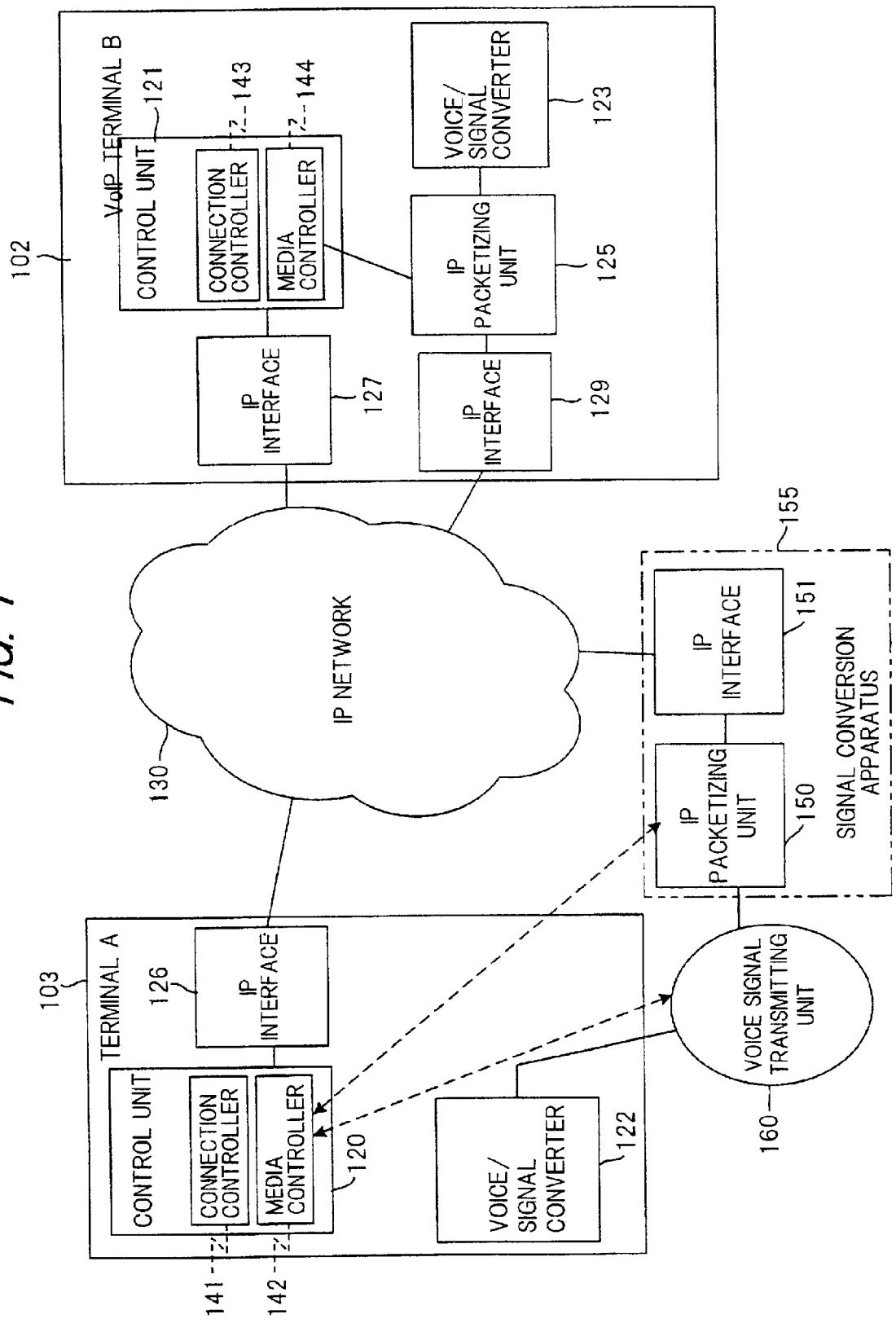
FIG. 1 is a block diagram showing the construction of a first embodiment of the present invention.

FIG. 1 is a block diagram showing the configuration of a media communication system according to a first embodiment of the present invention. Media communication (e.g., voice communication) is carried out via an IP network 130 between a terminal 103 (terminal A) and a terminal 102 (terminal B) each of which is capable of performing IP communication. The media communication system includes: an IP packetizing unit 150 for IP-packetizing and sending, to the IP network 130, a voice signal sent from terminal A, and for converting an IP packet received from the IP network 130 to a voice signal and sending the voice signal to terminal A, and a voice signal transmitting unit 160 for connecting a voice/signal converter 122, which is provided within terminal A, to the IP packetizing unit 150, and for sending voice signals. The terminal A has, in addition to the voice/signal converter 122, a control unit 120 for controlling connection to the other terminal 102 and for controlling sending/receiving of voice signals when a call is generated.

When a call is generated, terminal A performs control in such a manner that the IP packetizing unit 150 operates as its own IP packetizing unit and controls the voice signal transmitting unit 160 to connect the voice/signal converter 122 and the IP packetizing unit 150 so as to make transmission of a voice signal possible. Upon completion of the connection, the terminal A sends and receives voice signals to and from terminal B, which is the destination of communication, via the voice/signal converter 122, the voice signal transmitting unit 160, the IP packetizing unit 150, an IP interface 151 and the IP network 130.

More specifically, when the control unit 120 performs connection control, the controller (1) communicates with the IP packetizing unit 150 via the IP interface 126 and IP network 130 to acquire the IP address and port number of the IP packetizing unit 150, (2) reports this IP address and port number to terminal B at the destination via the IP network 130, and (3) receives the IP address and port number of terminal B from terminal B and reports these to the IP packetizing unit 150. (4) The IP packetizing unit 150 receives and packetizes a voice signal from the voice/signal converter 122 via the voice signal transmitting unit 160 and sends the resulting packet to the IP network 130 using the IP address and port number of terminal B as the destination. (5) Meanwhile, terminal B at the destination sends a voice-signal IP packet to the IP network 130 using the IP address and port number of the IP packetizing unit 150 as the destination, and (6) the IP packetizing unit 150 restores the IP packet received from the IP network to a voice signal and sends the voice signal to the voice/signal converter 122 via the voice signal transmitting unit 160, whereby the voice signal is output as voice from a speaker or the like, not shown.

If the above-described arrangement is adopted, the IP-packetization of voice is performed not in the terminal 103 but in the IP packetizing unit 150 (signal conversion apparatus 155) disposed in close proximity to the IP network 130. As a result, VoIP communication with little degradation of voice quality is possible. Moreover, it is possible to carry out end-to-end control, which is one of the merits of VoIP communication, thereby enabling the provision of flexible service.

Voice Signal Transmitting Unit 160

Figure 2:
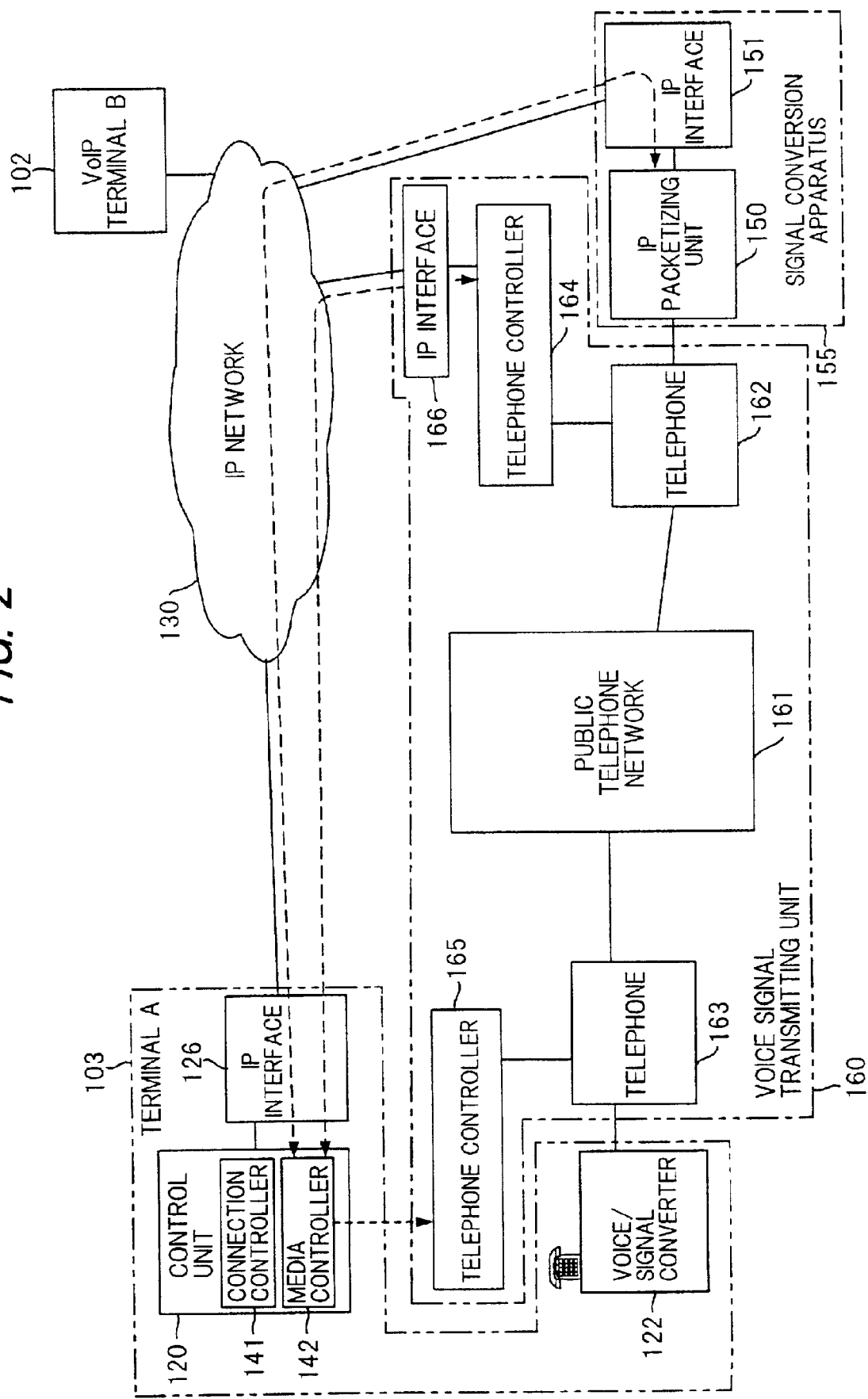
FIG. 2 is a block diagram showing an example of implementation (an example using a telephone network) of voice signal transmitting means according to the first embodiment.

The voice signal transmitting unit 160 is implemented by a public telephone, as shown by way of example in FIG. 2. To accomplish this, telephones 162, 163 and telephone controllers 165, 166 are provided on the side of terminal A and on the side of the IP packetizing unit 150 and the control unit 120 of terminal A controls these telephone controllers to connect the voice/signal converter 122 and IP packetizing unit 150 in such a manner that voice signals can be transmitted between them.

Figure 13:
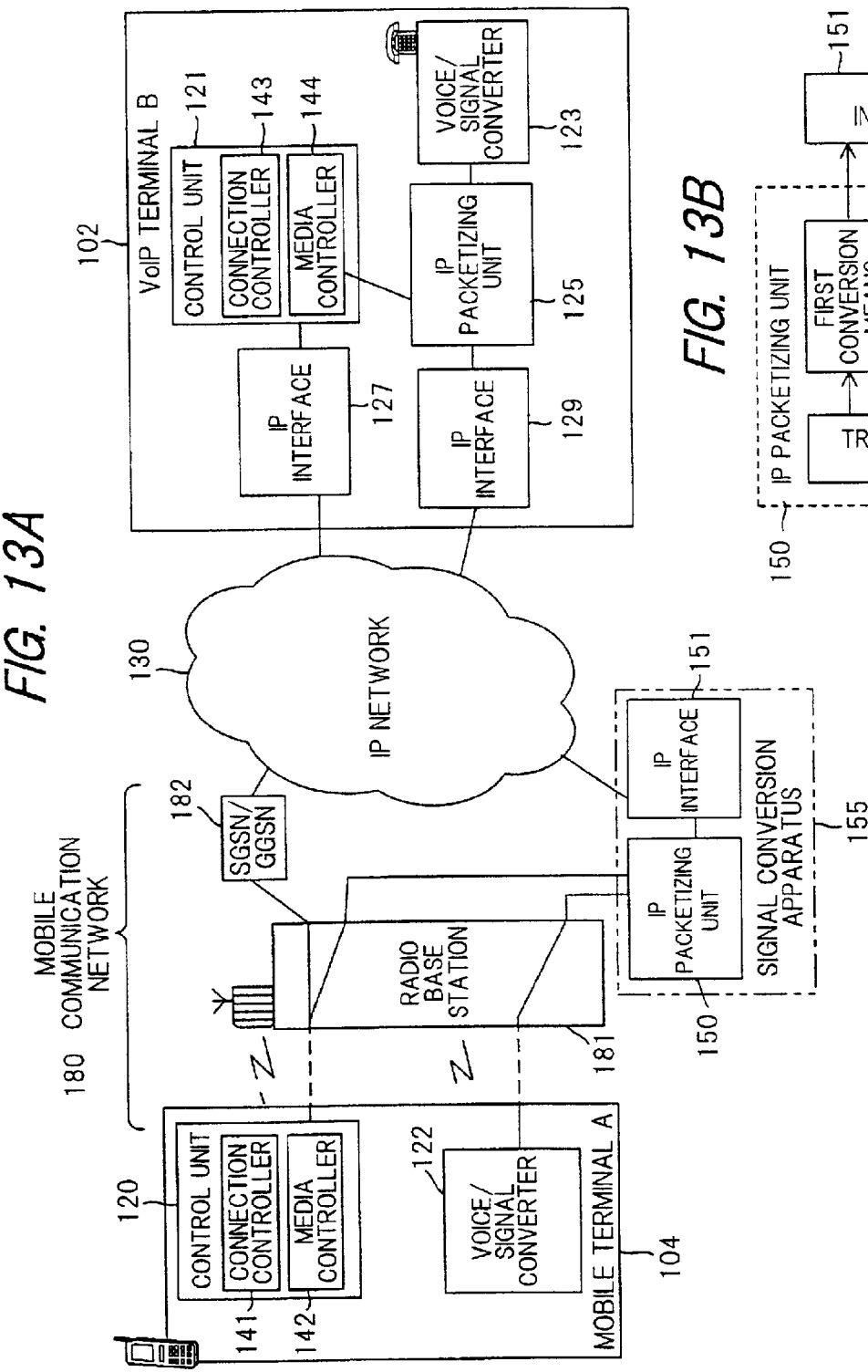
FIG. 13A is a block diagram showing the construction of a third embodiment of the present invention.
FIG. 13B is a partial block diagram of a signal conversion apparatus.
FIG. 13C is a block diagram illustrating a modification of the third embodiment.

In this case, the voice signal transmitting unit 160 can be implemented using a mobile communication network as the public telephone network, as illustrated in FIG. 13A. Since a mobile communication network is capable of communication with includes the communication of data, the communication means between terminal A and the IP network can be implemented using this mobile communication network. As a result, when a mobile communication network is employed, it is possible for the transmission of IP packets and the transmission of media (voice, images, etc.) to be achieved using the same mobile communication network. This makes it possible to realize more efficient communication.

If voice is transmitted by the voice signal transmitting unit 160 using a public telephone network, the connection between the voice/signal converter 122 and the IP packetizing unit 150 is implemented by an outgoing call from the side of the IP packetizing unit 150, thereby achieving the voice transmission. If this arrangement is adopted, the above-mentioned connection using a selected prescribed telephone can readily be achieved even if a plurality of telephones are connected to the IP packetizing unit 150. A further advantage is that this can be performed automatically.

Further, if voice is transmitted by the voice signal transmitting unit 160 using a public telephone network, the connection between the voice/signal converter 122 and the IP packetizing unit 150 is implemented by an outgoing call from the telephone 163 (FIG. 2) on the terminal side, thereby achieving the voice transmission. If this arrangement is adopted, the telephone number of the telephone 162 on the side of the IP packetizing unit 150 is allowed to be acquired by the terminal 103 in advance, as a result of which the above-mentioned connection can be made automatically by making transmission to this telephone number. Further, the charge to the originating terminal A for voice transmission over the public telephone network can readily be billed using the billing function of the public telephone network.

IP Packetizing Unit 150

Figure 9:
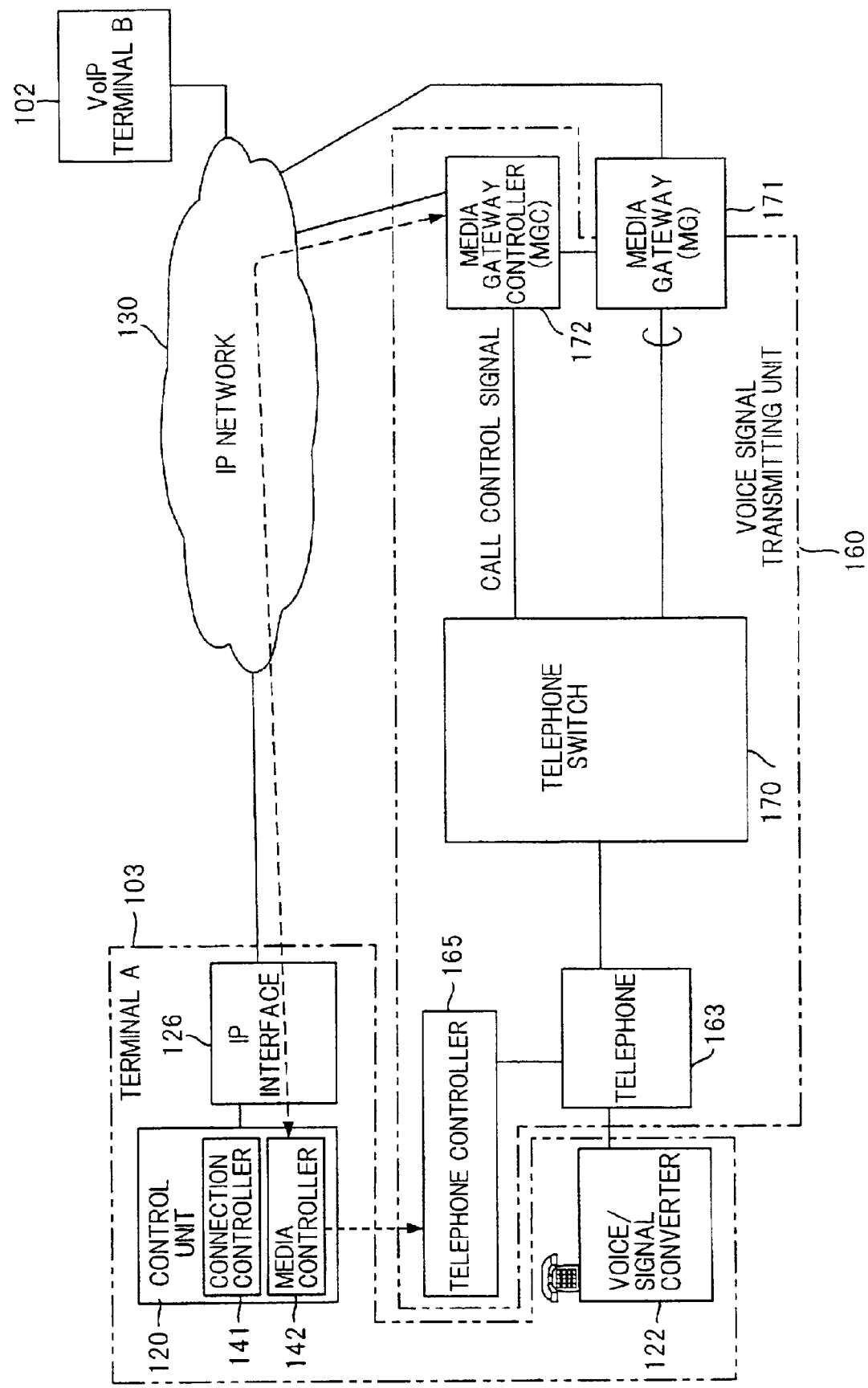
FIG. 9 is a block diagram showing an example of implementation of voice signal transmitting means according to a second embodiment.

The IP packetizing unit 150 is placed within the pubic network and the connection for transmitting voice between the terminal 103 and the IP packetizing unit 150 is made using the functionality of the public network. A media gateway (MG) 171 disposed in the public network in the manner shown in FIG. 9 is used as the IP packetizing unit 150, and the voice connection between the media gateway MG and voice/signal converter 122 of terminal A is implemented using a switch 170 in the public network. The media gateway MG is controlled by a media gateway controller (MGC) 712 in accordance with a predetermined protocol. In order for the terminal 103 to control the media gateway MG as the IP packetizing unit, therefore, this is implemented via the media gateway controller MGC.

The media gateway controller MGC and the switch 170 are connected by an ordinary public-network signaling system, e.g., Common Channel Signaling System No. 7. Control for connecting voice calls can be carried out by such signaling. Though a scheme for implementing VoIP communication that uses the media gateway MG and media gateway controller MGC is known, the scheme of the present invention differs in that the connection from the media gateway MG to terminal B is implemented by having terminal A communicate directly with terminal B or with a server (e.g., an SIP proxy server) that performs VoIP voice control. With the conventional scheme, basically the control of a connection from the media gateway MG to terminal B is performed by the media gateway controller MGC.

In a case where voice is transmitted via the voice signal transmitting unit 160 constituted by the public telephone network, the connection between the voice/signal converter 122 and media gateway 171 is implemented by a call that originates from the media gateway controller 172, thereby allowing voice transmission to take place. Generally speaking, the media gateway MG is connected to the switch 170 via a plurality of lines. Even this case an advantage is that a prescribed line can be selected and readily connected by placing a call from the media gateway controller MGC.

Further, in a case where voice is transmitted via the voice signal transmitting unit 160 constituted by the public telephone network, the connection between the voice/signal converter 122 and media gateway 171 is implemented by a call that originates from the telephone 163 on the terminal side. In order to effect the connection to the pertinent line of the media gateway MG in this case, the media gateway controller MGC previously assigns a number to each line and notifies the terminal 103 of the numerals to be dialed, inclusive of the assigned number. The applicable line is selected by this number. If this arrangement is adopted, the charge for voice transmission over the public telephone network can readily be billed on the side of the originating terminal using the functionality of the public telephone network.

Virtual MGC

Figure 12:
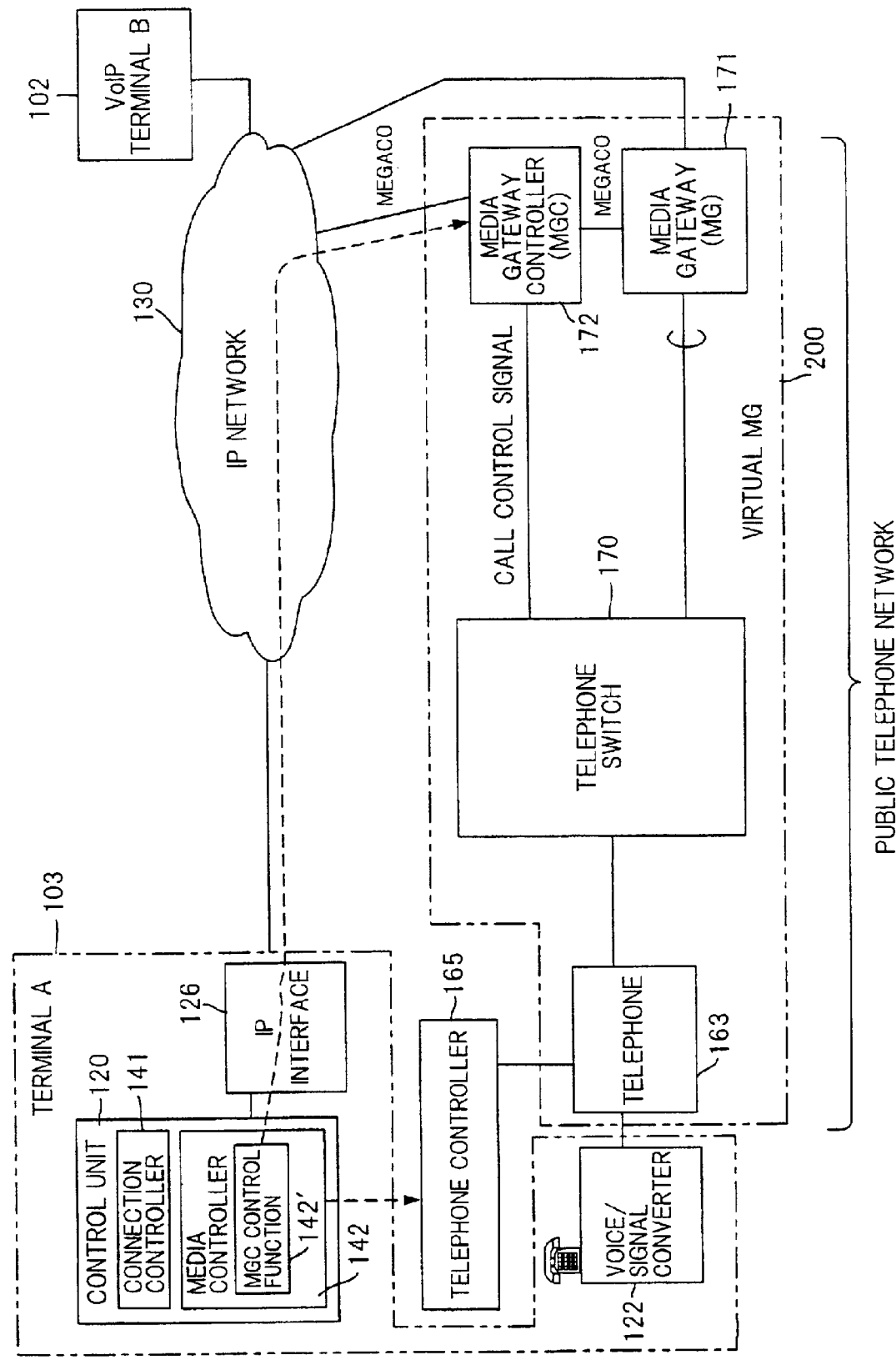
FIG. 12 is a block diagram illustrating a modification of the second embodiment.

As shown in FIG. 12, the control unit 120 of terminal A is provided with a control function similar to that of the media gateway controller (MGC) 172, and the elements from the telephone 163 on the side of terminal A to the media gateway (MG) 171 are regarded as one virtual media gateway 200. If this arrangement is adopted, terminal A can control the virtual media gateway 200 utilizing a protocol (Megaco protocol) the same as that which the media gateway controller MGC uses to control the media gateway MG. By virtue of this arrangement, a protocol for controlling the media gateway controller MGC from terminal A need not be defined anew; the connection of the voice signal transmitting unit can be set up utilizing the already defined Megaco protocol.

Utilization of Mobile Communication Network

The voice signal transmitting unit 160 can be implemented by a mobile communication network in the manner shown in FIG. 13A. Because a terminal (A) 104 and a radio base station 181 are connected wirelessly in an mobile communication network, the IP packetizing unit 150 is placed in the radio base station or in the base-station control office. Further, since the mobile terminal and the radio base station or base-station control office exchange control signals to connect a call in a mobile communication network, the communication of control signals between the terminal (A) 104 and IP packetizing unit 150 can be performed using means the same as those which effect the exchange of control signals.

Further, if the voice signal transmitting unit 160 is implemented by a mobile communication network, then, in a manner similar to that where the voice signal transmitting unit 160 is implemented by the public telephone network, the media gateway (MG) is placed in the mobile communication network as the IP packetizing unit 150, the terminal (A) 104 and the media gateway (MG) are connected via the radio base station or base-station control office, and control of the media gateway MG can be carried out by the media gateway controller (MGC).

If the terminal A is implemented by a mobile communication terminal, the terminal A is provided with the control function of the media gateway controller MG and the elements from the voice/signal converter 122 of terminal A to the media gateway MG placed in the network are regarded as one virtual media gateway. If this arrangement is adopted, mobile terminal can control the virtual media gateway utilizing a protocol (the Megaco protocol) the same as that which the media gateway controller MGC uses to control the media gateway MG.

Arrangement for Connecting to Communication-destination Terminal Via Private VoIP (Intracorporate IP Network)

Figure 14:
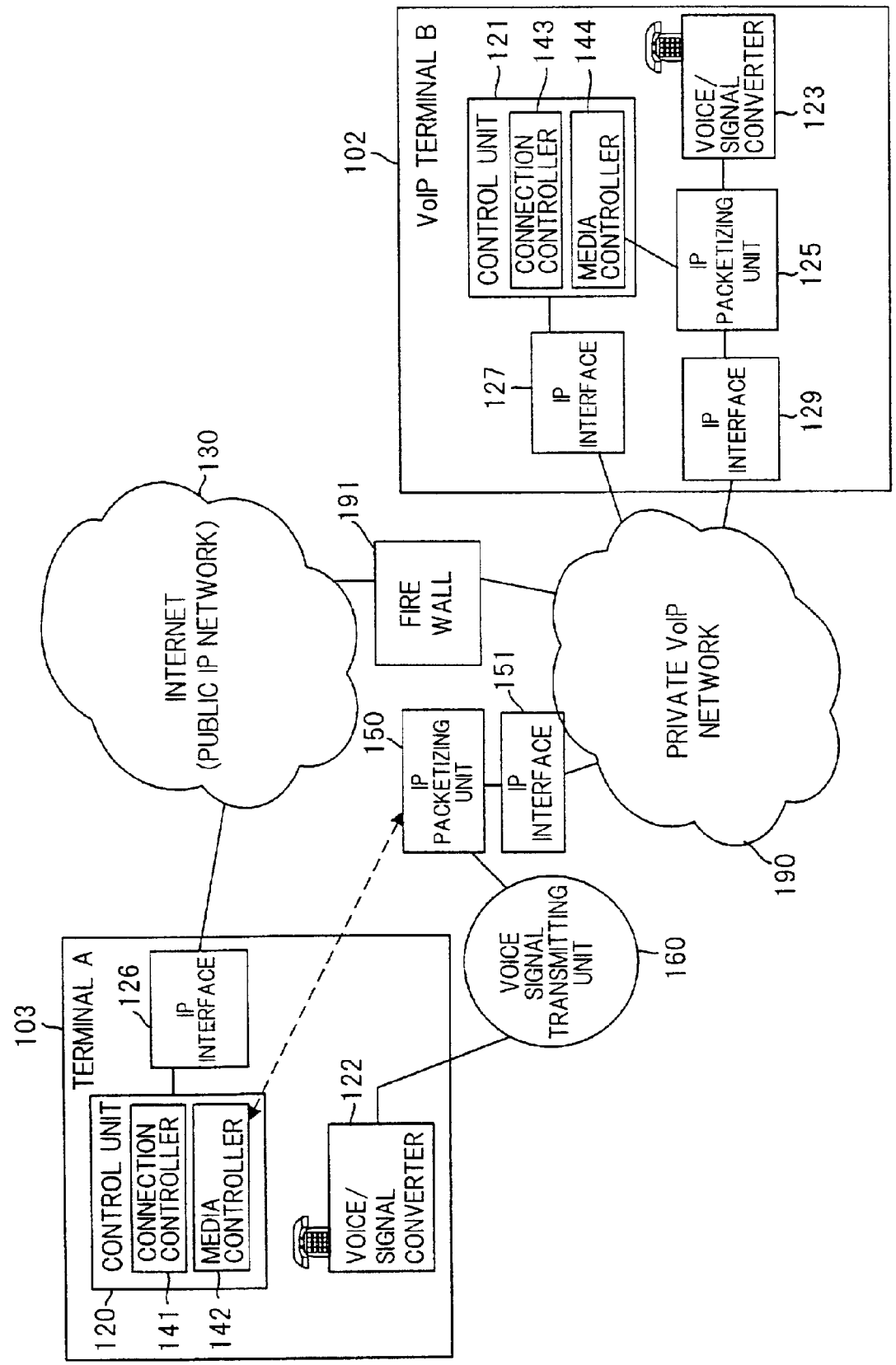
FIG. 14 is a block diagram illustrating a fourth embodiment of the present invention.

If a network (private VoIP network) 190 that is capable of IP media communication over a closed extension is present within a corporation or business, as shown in FIG. 14, it is necessary to adopt an arrangement in which media is communicated from the external terminal 103 to the internal terminal 102 via the private VoIP network (intracorporate IP network). To this end, the media communication system is provided with: (1) the public IP network 130 to which the external terminal (first terminal) 103 is connected; (2) the intracorporate IP network 190 to which the internal terminal (second terminal) 102 is connected; (3) a firewall 191 provided between the intracorporate IP network and the public IP network; (4) the IP packetizing unit 150 for IP-packetizing a voice signal sent from the first terminal and sending it to the intracorporate IP network, and for converting an IP packet received from the intracorporate IP network to a voice signal; and (5) the voice signal transmitting unit 160 for connecting the voice/signal converter 122, which is provided in the first terminal, to the IP packetizing unit 150 to thereby transmit a voice signal.

The first terminal 103 (1) performs control via the IP network 130, firewall 191 and intracorporate IP network 190 in such a manner that the IP packetizing unit 150 operates as its own IP packetizing unit when a call is generated, and (2) controls the voice signal transmitting unit 160 in such a manner that the internal voice/signal converter 122 and IP packetizing unit 150 are connected. (3) Upon completion of connection control, the first terminal 103 sends and receives voice signals to and from the second terminal 102 via the voice/signal converter 122, voice signal transmitting unit 160, IP packetizing unit 150 and intracorporate IP network 190. As a result, the first terminal 103 can send voice signals using the intracorporate IP network 190 just as if it were connected directly to the intracorporate IP network 190, without the intervention of the firewall 191. In this case, the voice signal transmitting unit can be implemented by a public telephone network and mobile communication network.

Arrangement for Bypassing Firewall

Figure 15:
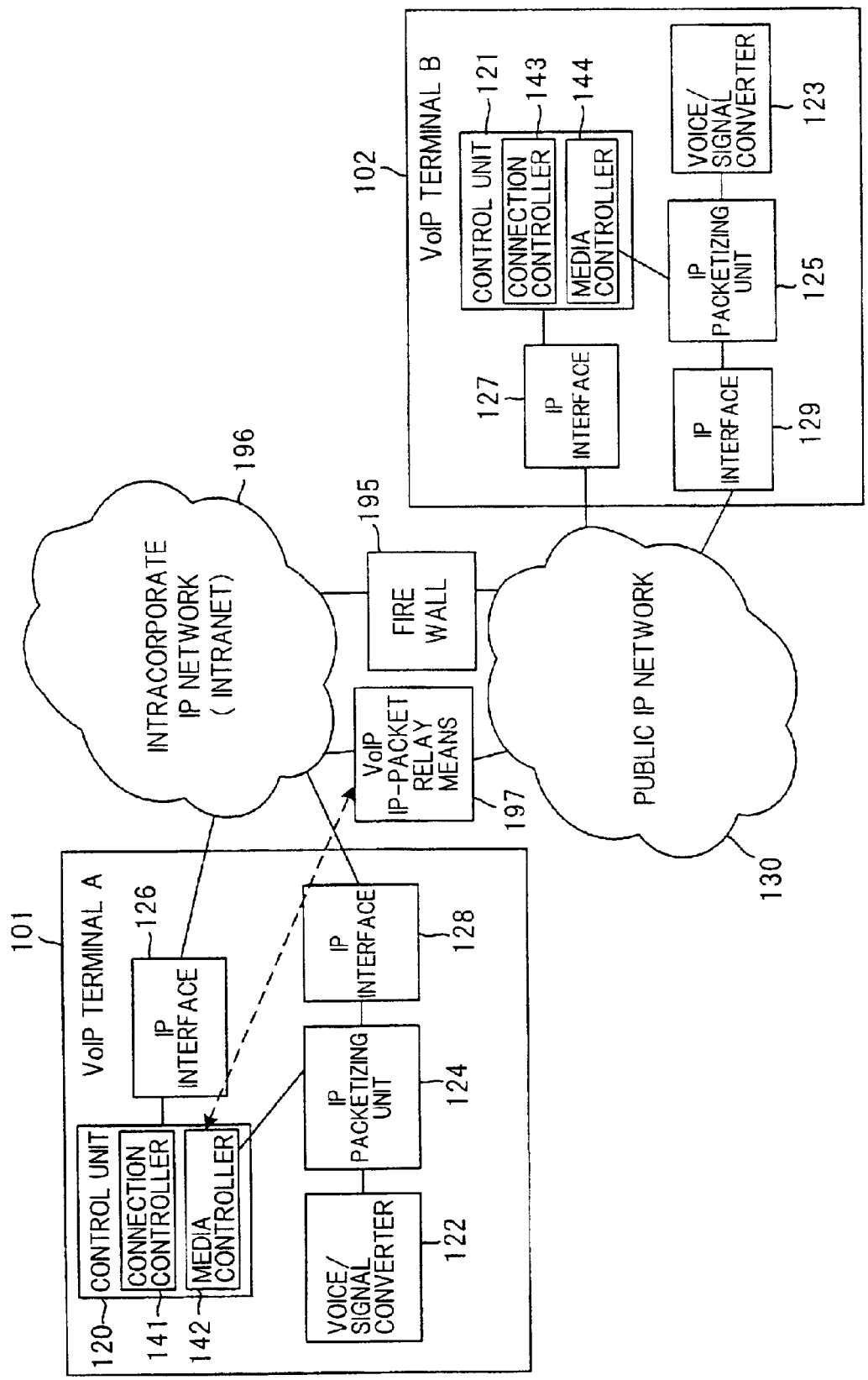
FIG. 15 is a block diagram illustrating a fifth embodiment of the present invention.
Figure 16:
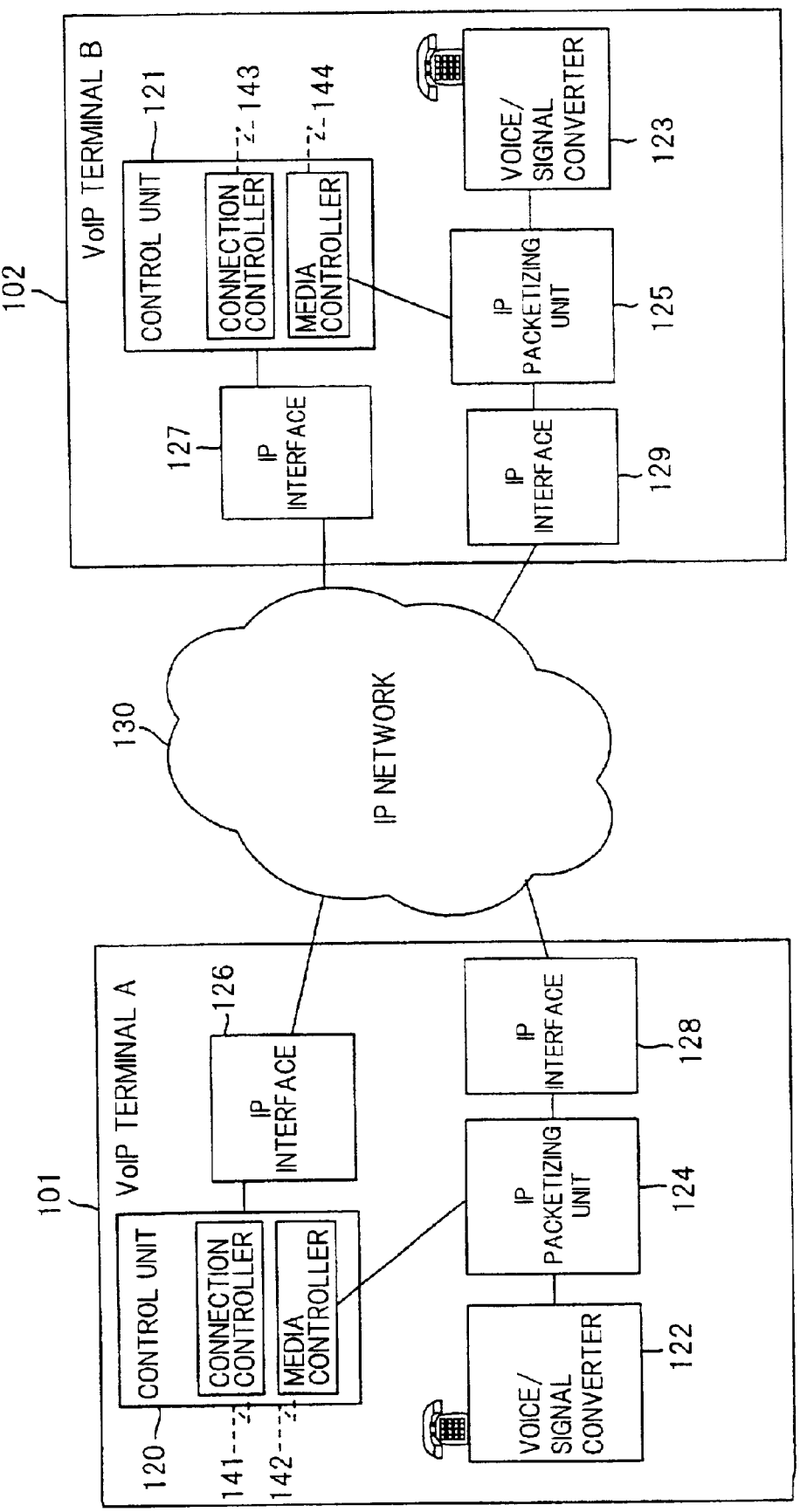
FIG. 16 is a block diagram illustrating ordinary VoIP according to the prior art.

The amount of processing associated with a firewall can be reduced by so arranging that voice IP packets will not traverse the firewall. To this end, the media communication system includes the following, as shown in FIG. 15: (1) an intracorporate, closed internal IP network (intracorporate IP network) 196 to which the first terminal 101 is connected and which is capable of IP media communication; (2) the external IP network (public IP network) 130 to which the second terminal 102 is connected; (3) a firewall 195 provided between the intracorporate IP network 196 and the public IP network 130; and (4) IP-packet relay means 197 provided between the intracorporate IP network 196 and public IP network 130 for bypassing the firewall 195. The first terminal 101 performs control via the intracorporate IP network 196, firewall 195 and IP network 130 in such a manner that, when a call is generated, the IP-packet relay means 197 operates as its own IP-packet relay means, and (2) controls connection in such a manner that a media signal is capable of being transmitted via the intracorporate IP network 196, IP-packet relay means 197 and public IP network 130. (3) Upon completion of the connection, the first terminal 101 sends and receives media signals to and from the second terminal 102 via the intracorporate IP network 196, IP-packet relay means 197 and public IP network 130.

(B) First Embodiment (a) Overall Construction

FIG. 1 is a block diagram illustrating the overall construction of a first embodiment of the present invention. Here the terminal 103 (terminal A) and the VoIP terminal 102 (terminal B) are constructed so as to be capable of IP communication. Communication of media is performed between the two terminals via the IP network 130. The terminal 103 includes the control unit 120 for performing connection control and media control, the IP interface 126 which allows the control unit 120 to transmit control signals via the IP interface 126, and the voice/signal converter 122 for performing the conversion between voice and an electric signal. The VoIP terminal 102 includes the controller 121 for performing connection control and media control, the voice/signal converter 123 for performing the conversion between voice and an electric signal, the IP packetizing unit 125 which functions to place voice signals in IP packets, and the IP interfaces 127, 129. The control unit 120 of terminal A has the connection controller 141 for performing connection control and the media controller 142 for performing media control, and the controller 121 of terminal B has the connection controller 143 for performing connection control and the media controller 144 for performing media control.

The IP packetizing unit 150 of the signal conversion apparatus 155, which is provided externally of the terminal 103, IP-packetizes a voice signal, which is sent from the terminal 103, and sends the IP packet in the direction of the terminal 102 via the IP interface 151 and IP network 130. The IP packetizing unit 150 further converts an IP packet received from the IP network 130 to a voice signal and sends the voice signal in the direction of the terminal 103. The voice signal transmitting unit 160 connects the voice/signal converter 122, which is provided within terminal 103, to the IP packetizing unit 150, and sends voice signals in both directions.

(b) Construction of Voice Signal Transmitting Unit 160

FIG. 2 is a block diagram showing an example of implementation of the voice signal transmitting unit 160 of FIG. 1. This is for a case where the voice signal transmitting unit 160 is implemented by a public telephone network. The voice signal transmitting unit 160 includes a public telephone network 161; the telephone 162 on the side of the IP packetizing unit 150 and the telephone 163 on the side of terminal 103, both of which are connected to the public telephone network 161; telephone controllers 164, 165 for controlling the telephones 162, 163, respectively; and an IP interface 166 for connecting the telephone controller 164 to the IP network 130. The telephone 162 is provided between the public telephone network 161 and the IP packetizing unit 150, and the telephone 163 is provided between the voice/signal converter 122 and the public telephone network 161.

The media controller 142 of control unit 120 in terminal 103 is connected directly to the telephone controller 165. The latter is capable of controlling the telephone 163. The voice/signal converter 122 is connected to the telephone 163 and is so adapted as to be capable of sending and receiving voice signals to and from the IP packetizing unit 150 via the public telephone network 161 and telephone 162. A voice signal is the result of converting the voice of the user to an electric signal. As mentioned above, voice signals can be sent to and received from a communicating party through the ordinary telephones 162, 163 and public telephone network 161. In the case of other media signals such as image signals, signals in the voice band are transmitted upon being modulated, whereby these can be transmitted through the telephones and public telephone network.

The telephone controller 164 controls the telephone 162 connected to the IP packetizing unit 150. The telephone controller 164 is connected to the IP network 130 by the IP interface 166 and is capable of sending and receiving control signals to and from the media controller 142 of terminal 103 via the IP network 130. The IP packetizing unit 150 is connected to the IP network 130 via the IP interface 151. As a result of these connections, the media controller 142 of terminal A is capable of controlling the IP packetizing unit 150 by sending and receiving control signals to and from the IP packetizing unit 150 via the IP network 130.

(c) Connection Sequence

Figure 3:
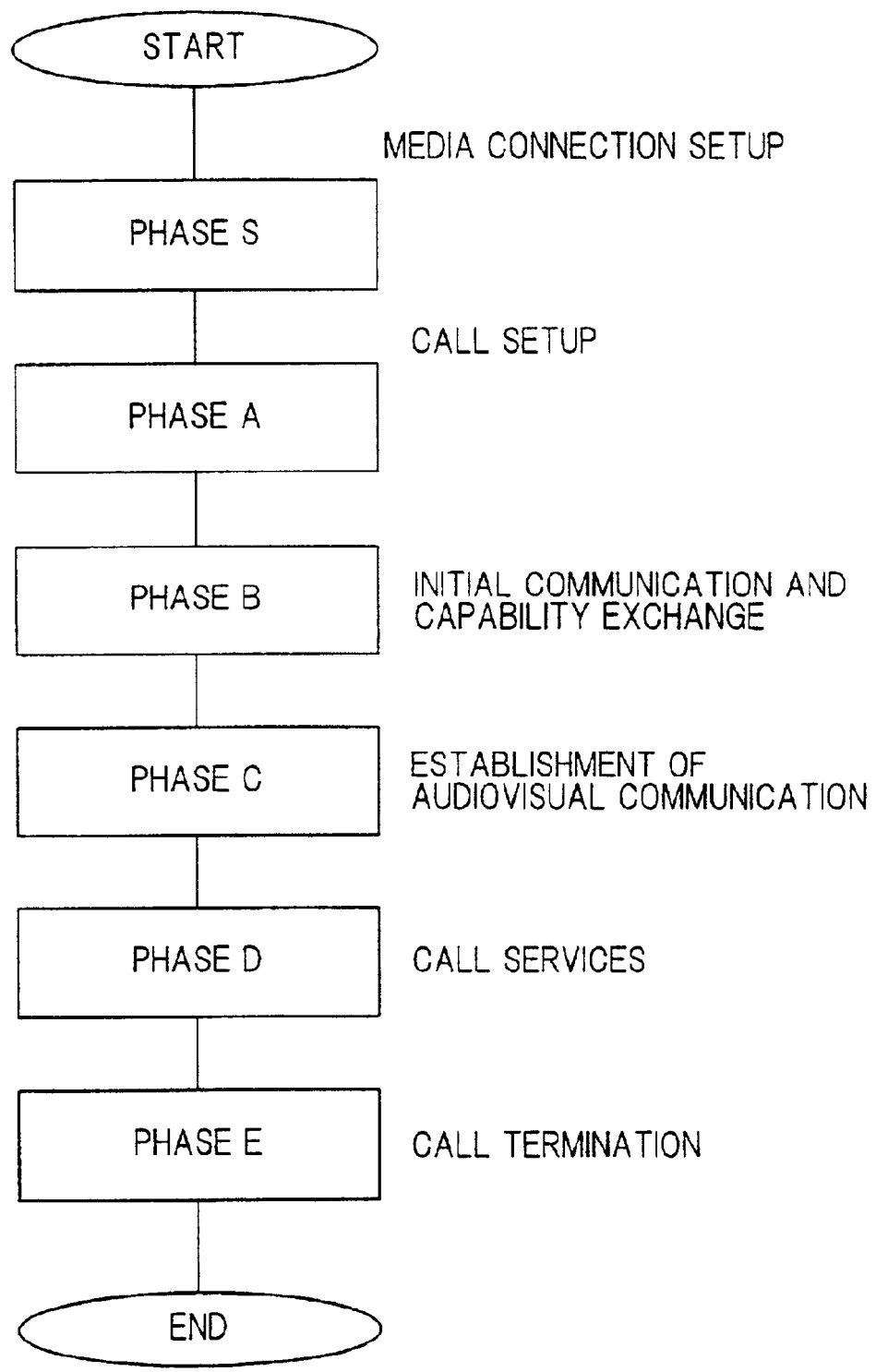
FIG. 3 is a diagram useful in describing a procedure for connecting a VoIP call.
Figure 17:
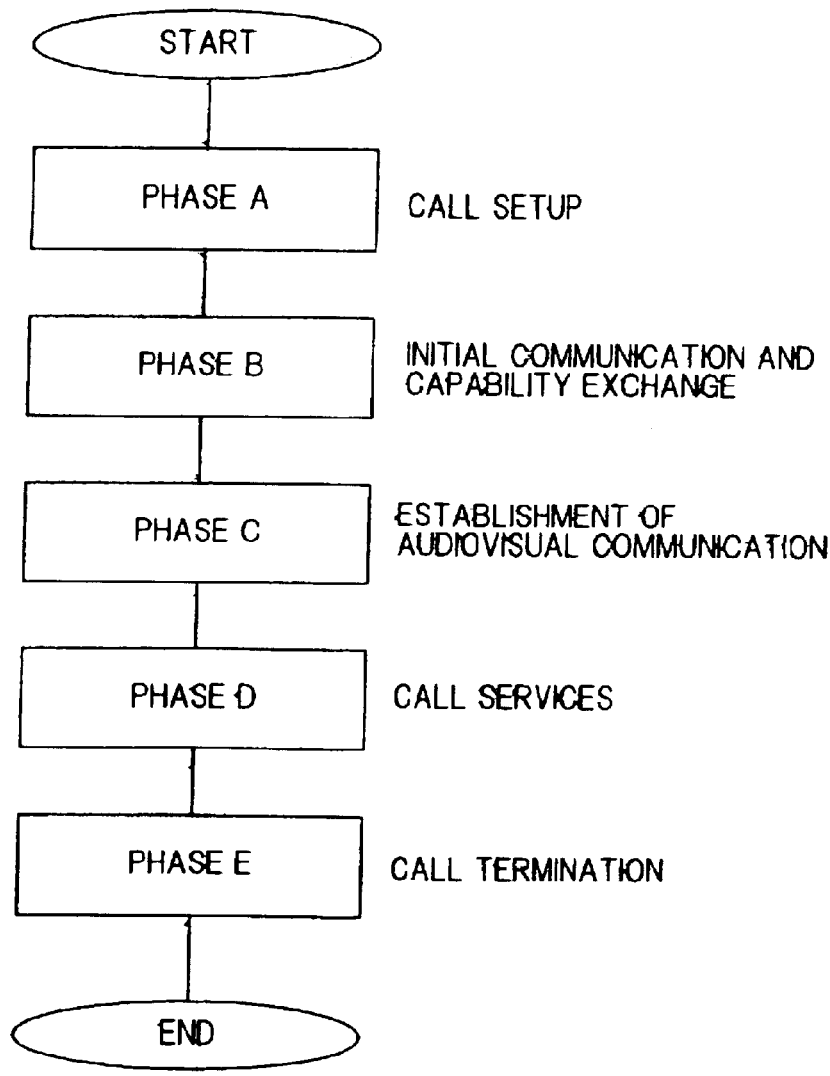
FIG. 17 is a diagram useful in describing a procedure for connecting VoIP calls according to the prior art.

As shown in FIG. 3, the VoIP connection sequence of the present invention has an additional phase S as compared with the conventional VoIP connection sequence (see FIG. 17). In Phase S, the voice signal transmitting unit 160 is controlled to connect the voice/signal converter 122 of terminal 103 with the IP packetizing unit 150. It is not necessary to execute this phase for each individual call; the phase can be used jointly by multiple calls. In other words, once the voice/signal converter 122 of the originating terminal A and the IP packetizing unit 150 have been connected in the phase, a plurality of calls can be connected using this connection.

1. Phase S: Media Connection Setup

Figure 18:
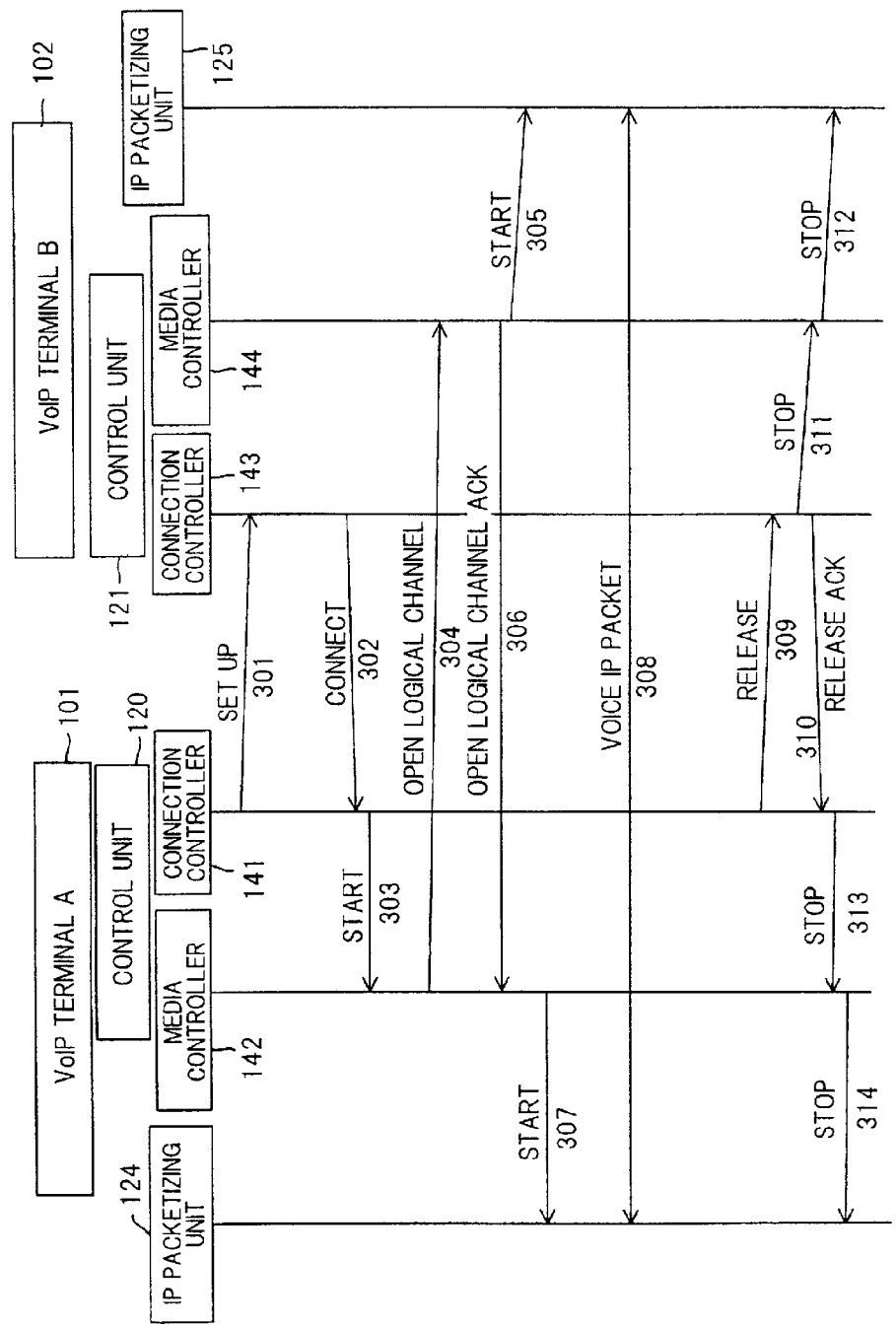
FIG. 18 shows a VoIP call connection sequence (in case of H.323) according to the prior art.
Figure 19:
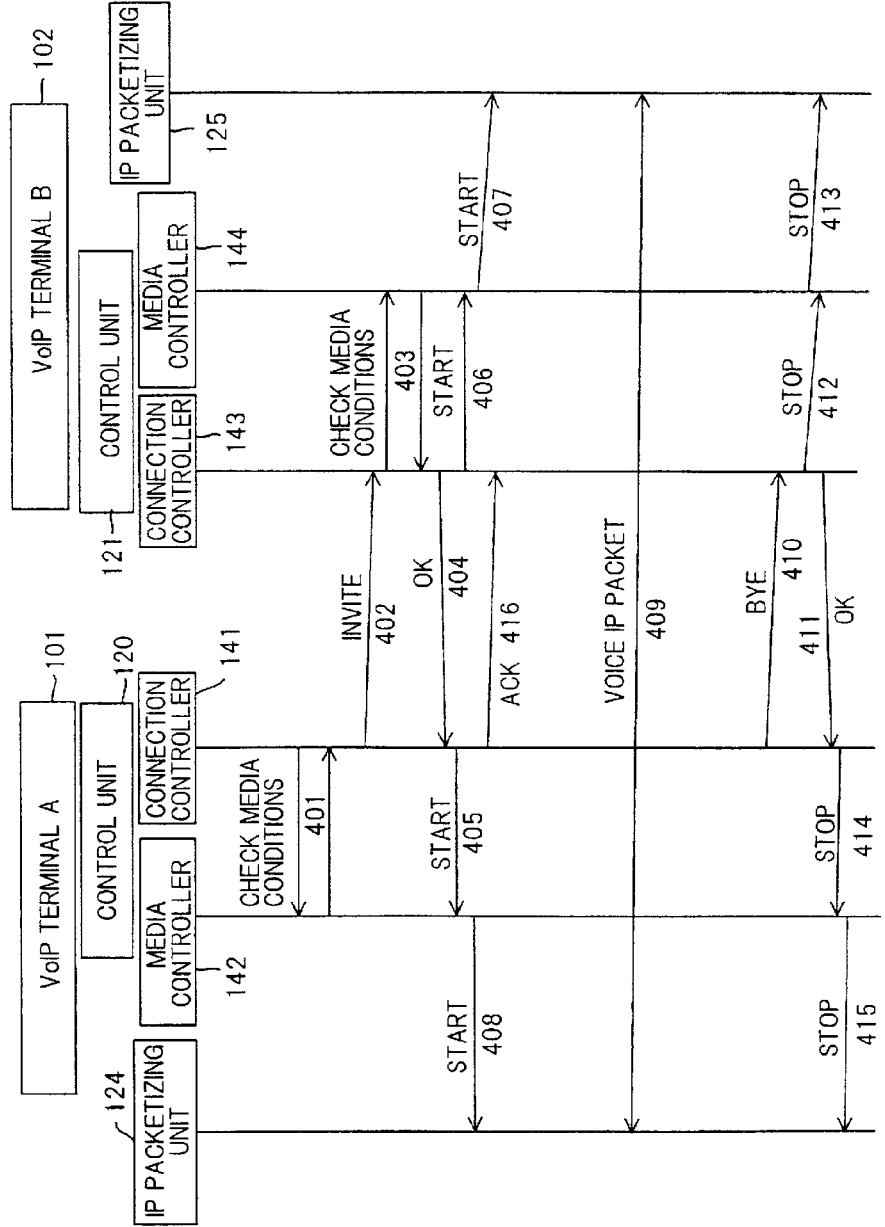
FIG. 19 shows a VoIP call connection sequence (in case of SIP) according to the prior art.
Figure 20:
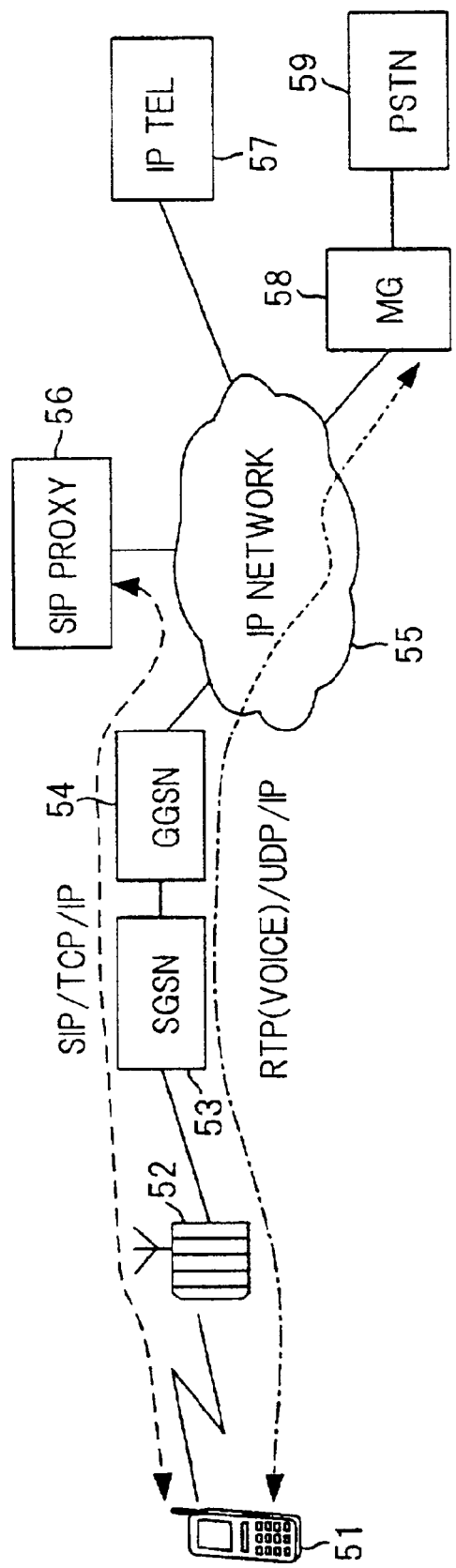
FIG. 20 is a diagram showing All-IP architecture according to the prior art.

Phase S is a phase that precedes the connection of a call. As mentioned above, this phase controls the voice signal transmitting unit 160 to connect the voice/signal converter 122 of terminal 103 and the IP packetizing unit 150 and makes it possible to IP-packetize a voice signal by the IP packetizing unit 150. After the procedure of Phase S is completed, the connection sequence is identical with that of ordinary VoIP communication shown in FIG. 18 and a call can be set up through a similar procedure. It is possible to set up multiple calls as well.

Figure 4:
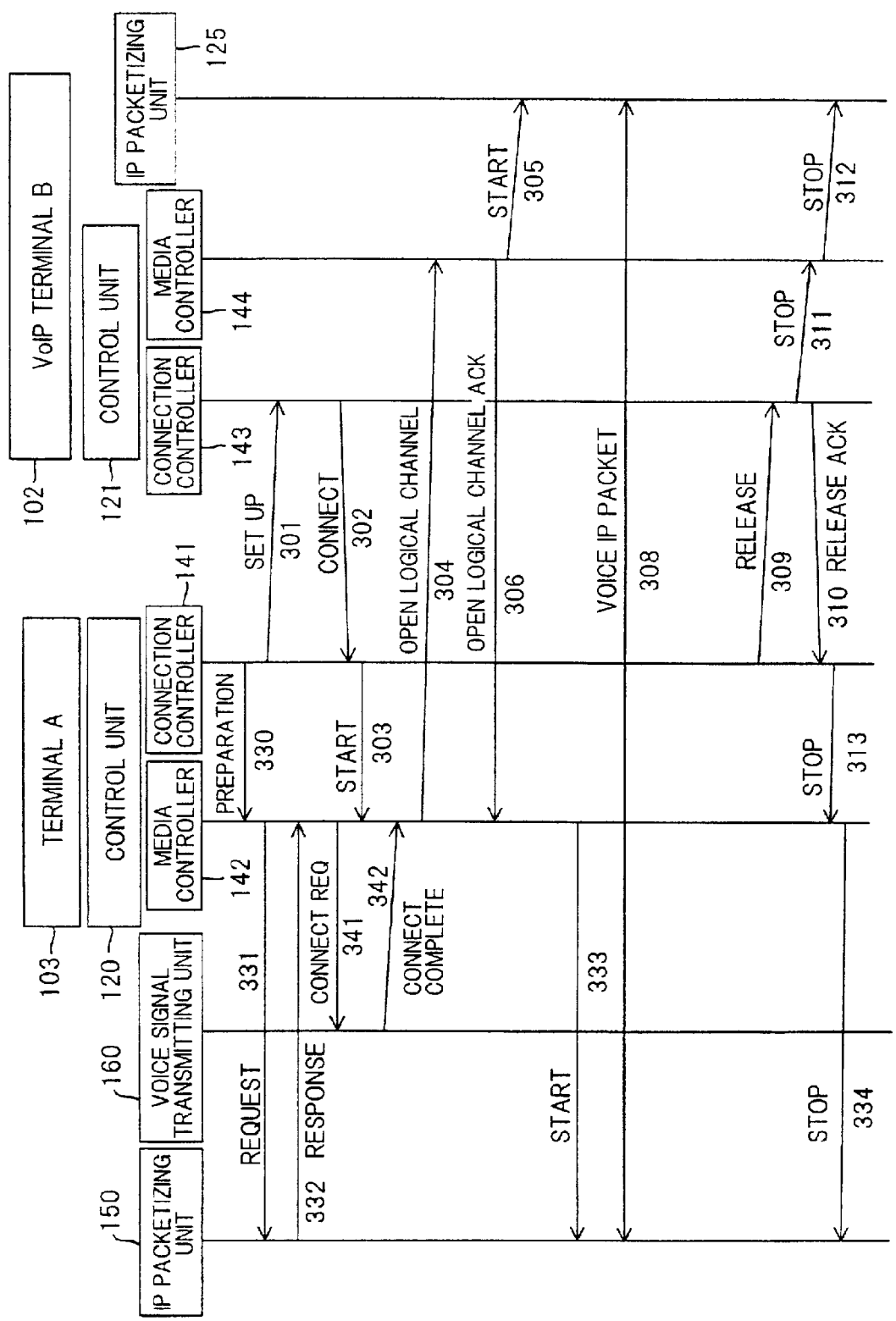
FIG. 4 shows a VoIP call connection sequence (in case of H.323) when a call is originated.

FIG. 4 is a diagram useful in describing the connection sequence of a VoIP call when the call is originated. FIG. 4 employs the H.323 protocol. If the user performs an operation to originate a call, the connection controller 141 of terminal 103 orders the media controller 142 to prepare for media communication (i.e., sends a Preparation message 330) before the connection is established. Upon receiving the Preparation message 330, the media controller 142 sends a Request message 331 to the IP packetizing unit 150 to request resources for converting voice to an IP packet. In response to this request, the IP packetizing unit 150 sends back, by way of a Response message 332, the necessary information such as the IP address and port number of the packetizing unit that performs the IP packetizing, and the encoding scheme used when the voice signal is IP-packetized. The IP packetizing unit 150 reports both the IP address and port number of the telephone controller 164 of its own connected telephone 162.

Next, the media controller 142 sends a Connect Request message 341 to the voice signal transmitting unit 160 via the IP network 130 to connect the voice/signal converter 122 of terminal 103 and the IP packetizing unit 150, and the telephone controller 164 sends a Connect Complete message to the media controller 142 at completion of the connection.

Figure 5:
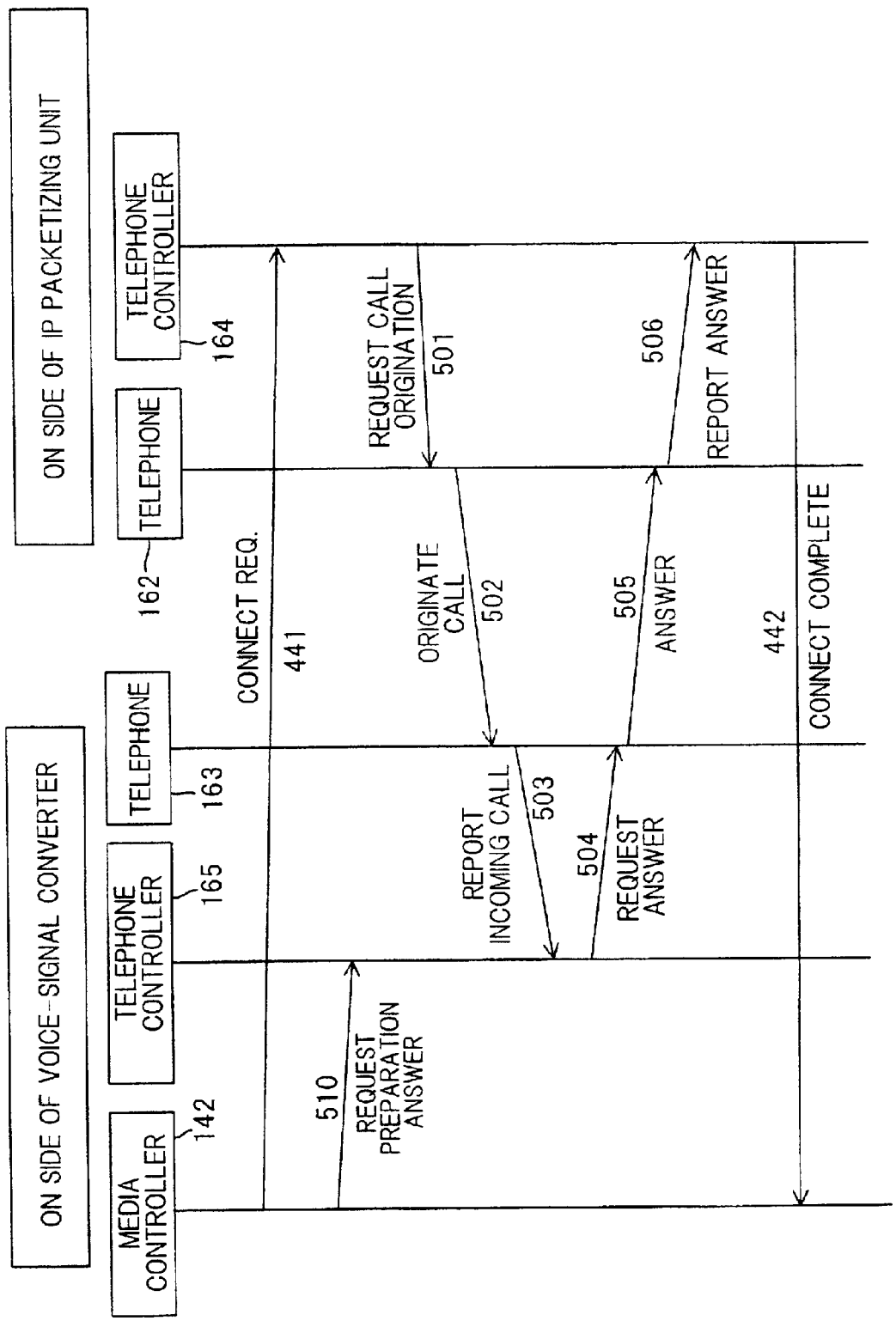
FIG. 5 shows a sequence for connecting a voice/signal converter and an IP packetizing unit.

This will be described in greater detail with reference to FIG. 5. The media controller 142 reports the telephone number of telephone 163 connected to the voice/signal converter 122 to the telephone controller 164 having the IP address and port number acquired through the above-described procedure and requests origination of a call to this telephone number via the IP network (Connect Request 441 in FIG. 5). Further, the media controller 142 requests the telephone controller 165 of telephone 163 on the side of the voice/signal converter 122 to answer if there is an incoming call (answer preparation message 510 in FIG. 5). By virtue of the above operation, the telephone controller 164 requests the telephone 162 to originate a call to telephone 163 (501). The telephone 162 originates the call and the incoming call arrives at the telephone 163 (502). When the call arrives, the telephone 163 so notifies the telephone controller 165 (503). Upon being notified of the incoming call, the telephone controller 165 requests that an incoming-call response be sent to the telephone 162, thereby completing the connection (503 to 505).

2. Phase A: Call Setup Phase

Phases from Phase A onward constitute a connection procedure that basically is the same as that of the prior art.

This phase is a procedure through which agreement is obtained for the purpose of setting up a call between the terminals A and B. The originating terminal (A) 103 sends a call set-up response to the call-terminating terminal (B) 102 by the Set-Up message 301, and the terminal B decides whether or not to set up the call. If the call is set up, the terminal 102 notifies the originating terminal 103 of call set-up by Connect message 302 and reports also the address (connect address) used in the ensuing Phase B. The details of the procedure of Phase A will now be described with reference to FIG. 4 on the basis of FIG. 1.

First, the connection controller 141 of the control unit 120 in terminal A edits an IP packet in which has been placed a message (Set-Up message 301) requesting the set-up of a call the destination whereof is the IP address of the IP interface 127 of controller 121 in the VoIP terminal B of the communicating party. The connection controller 141 requests the IP interface 126 to transmit this IP packet. The IP interface 126 transmits the IP packet in the direction of the IP interface 127 via the IP network.

Upon receiving the call set-up request message from the terminal 103 via the IP interface 127, the terminal 102 delivers this request message to the connection controller 143 of the control unit 121. The connection controller 143 decides whether this call set-up request can be answered and, if it can be answered, sends an answer message (Connect message 302) back to terminal A via the IP network. The contact address (IP address and port number) used in the ensuing Phase B is reported at this time. In the example of FIG. 1, the Connect message 302 reports the IP address and port number necessary to communicate with the media controller 144 that exercises control in Phase B.

Upon receiving the above-mentioned answer message, the connection controller 141 of terminal 103 in effect agrees with terminal 103 to connect the call and delivers the privilege for subsequent control to the media controller 142 together with the IP address and port number (contact address) of the terminal 102 used in the ensuing Phase B (Start 303).

3. Phase B: Initial Communication and Capability Exchange

The media controller 142 of terminal 103 that obtained the control privilege edits an IP packet having information necessary for voice communication, the information including (1) information indicating the voice encoding scheme of terminal A, (2) the IP address of the IP interface 151 that sends and receives voice packets, and (3) the port number of the IP packetizing unit 150, and sends this information (Open Logical Channel message 304) to the destination indicated by the IP address and port number of terminal B that were reported through the procedure of Phase A. It should be noted that the IP address and port number of (1), (2) above constitute information already obtained from the IP packetizing unit 150 through the procedure of Phase S.

Upon receiving the Open Logical Channel message, the media controller 144 of control unit 121 in terminal 102 determines whether the voice encoding scheme on the side of terminal B matches the requested encoding scheme. If the schemes match and voice communication is possible, the terminal 102 edits an IP packet having information necessary for voice communication, the information including the IP address of the IP interface 129 that sends and receives voice packets, and a port number for selecting the voice IP packetizing unit 125, and sends this IP packet to the terminal 10e (Open Logical Channel Ack 306). As a result of these operations, information for communicating voice between both VoIP terminals A and B is obtained on both sides.

Figure 6:
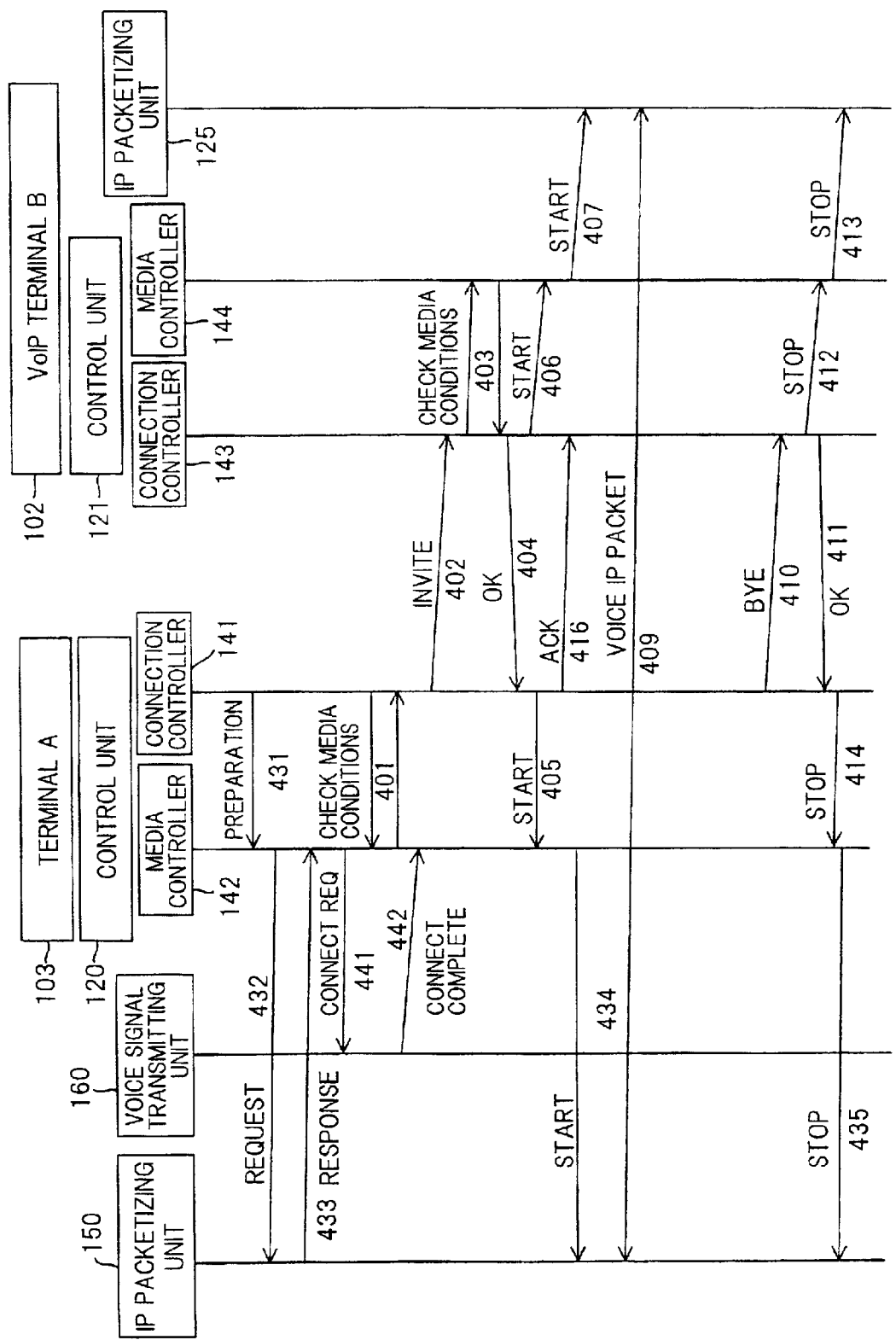
FIG. 6 shows a VoIP call connection sequence (in case of SIP) when a call is originated.

The foregoing is an example in which the H.323 protocol is used. However, a connection can be established using SIP (Session Initiation Protocol) instead of this protocol. In such case the sequence becomes as shown in FIG. 6 by way of example. In this sequence, Phases A and B are consolidated and expressed by a single message. Specifically, the connection controller 141 of terminal 103 queries the media controller 142 regarding the conditions usable in media communication (401) and, as a result, information necessary for media communication, namely (1) the voice encoding scheme of terminal A, (2) the IP address of the IP interface 151 and (3) port number of the IP packetizing unit 150, etc., is obtained. Next, the connection controller 141 sends the a connection set-up request message, which is inclusive of this information, to the connection controller 143 of terminal B (Invite message 402) via the IP network. Upon receiving the Invite message 402, the media controller 142 of terminal B determines whether the connection can be established and, if the connection can be established, reports the voice communication conditions of terminal A to the media controller 144 of terminal B, acquires the voice communication conditions (403) on the side of terminal B from the media controller 144 and sends this information to the connection controller 141 of terminal A by OK message 404. In order to verify receipt of the OK message, the connection controller 141 of terminal A transmits the ACK message 416 to terminal B.

The connection controller 141 of terminal A delivers the information of the OK message to the media controller 142. As a result of the procedure set forth above, information for communicating media between the VoIP terminals A and B is obtained on both sides.

4. Phase C: Establishment of Audiovisual Communication

The media controllers 142, 144 of both VoIP terminals A and B notify the IP packetizing units 150, 125 of the destination IP addresses and port numbers, which are for sending and receiving voice packets, acquired through the above-described procedure, and the IP packetizing unit 150 starts sending the voice signal using the reported IP address and port number as the destination. Start messages (305, 333) in FIG. 4 and Start messages (407, 434) in FIG. 6 correspond to these parts of the procedure. In this case, the media controller 142 transmits the Start messages (333 and 434) to the IP packetizing unit 150 via the IP network. That is, the Start messages 333, 434 are sent to IP address of the IP interface 151 and port number of the IP packetizing unit 150 that were obtained by the procedure of Phase S.

The voice signal received from the voice/signal converter via the voice signal transmitting unit is packetized by the IP packetizing unit 150, arrives at the IP interface 129 of terminal B having the IP address of the destination and is input to the receiving-side IP packetizing unit 125 selected by the specified port number. The IP packetizing unit 125 converts the entered voice packet to a voice signal and inputs the voice signal to the voice/signal converter 123. The latter converts the voice signal to voice and outputs the same. The voice signal in the opposite direction is transmitted in a similar manner, whereby voice communication becomes possible (voice packets are sent and received at 308 and 309).

5. Phase D: Call Service

By changing the IP address of the communicating party to another IP address during communication, it is possible with the voice communication established in Phase B to change the destination of the connection. Services such as third-party conversation and call transfer are implemented using this function.

6. Phase E: Call Termination

In order to release a connected call, the connection controller 141 of the terminal 103 sends a release request message Release or Bye (309 in FIG. 4 and 410 in FIG. 6) to the terminal 102 on the called side and instructs the IP packetizing unit 150 to stop the sending of voice (Stop 313, 334 in FIG. 4 and Stop 414, 435 in FIG. 6). Upon receiving the release request message, the terminal 102 at the communication destination instructs the IP packetizing unit 125 on the side of this terminal to halt the sending of voice (Stop 311, 312 in FIG. 4 and Stop 412, 413 in FIG. 6) and sends a message to answer the release request (Release Ack or OK message) (310 in FIG. 4 and 411 in FIG. 6). As a result, the resources that were being used in the connection of the call are released and the call can be disconnected. If the connection controller 141 of terminal 103 that requested release cannot receive Release Ack 310 within a fixed period of time, this terminal resends the release request message. This makes it possible to release the call connection reliably even in cases where the message has been lost. After the call is released, the media signal transmitting unit connected in Phase S is released. This is carried out by sending a disconnect request message from the control unit of terminal 103 to the telephone controllers 164, 165. In a case where the control unit of terminal A continues with the connection of another call, the procedure from Phase A onward is executed without effecting release, thereby making it possible to connect the other call.

Figure 7:
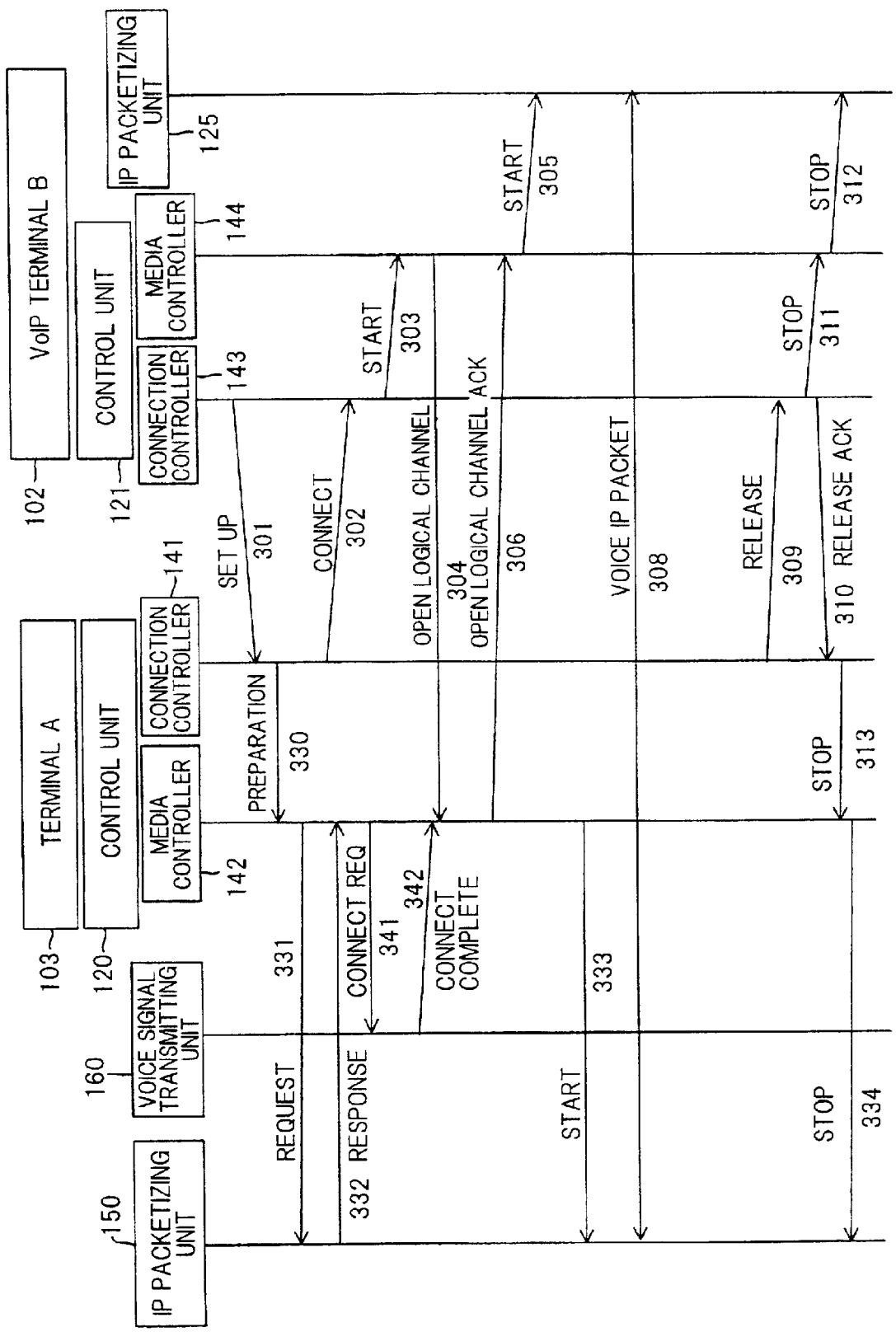
FIG. 7 shows a VoIP call connection sequence (in case of H.323) at the time of an incoming call.
Figure 8:
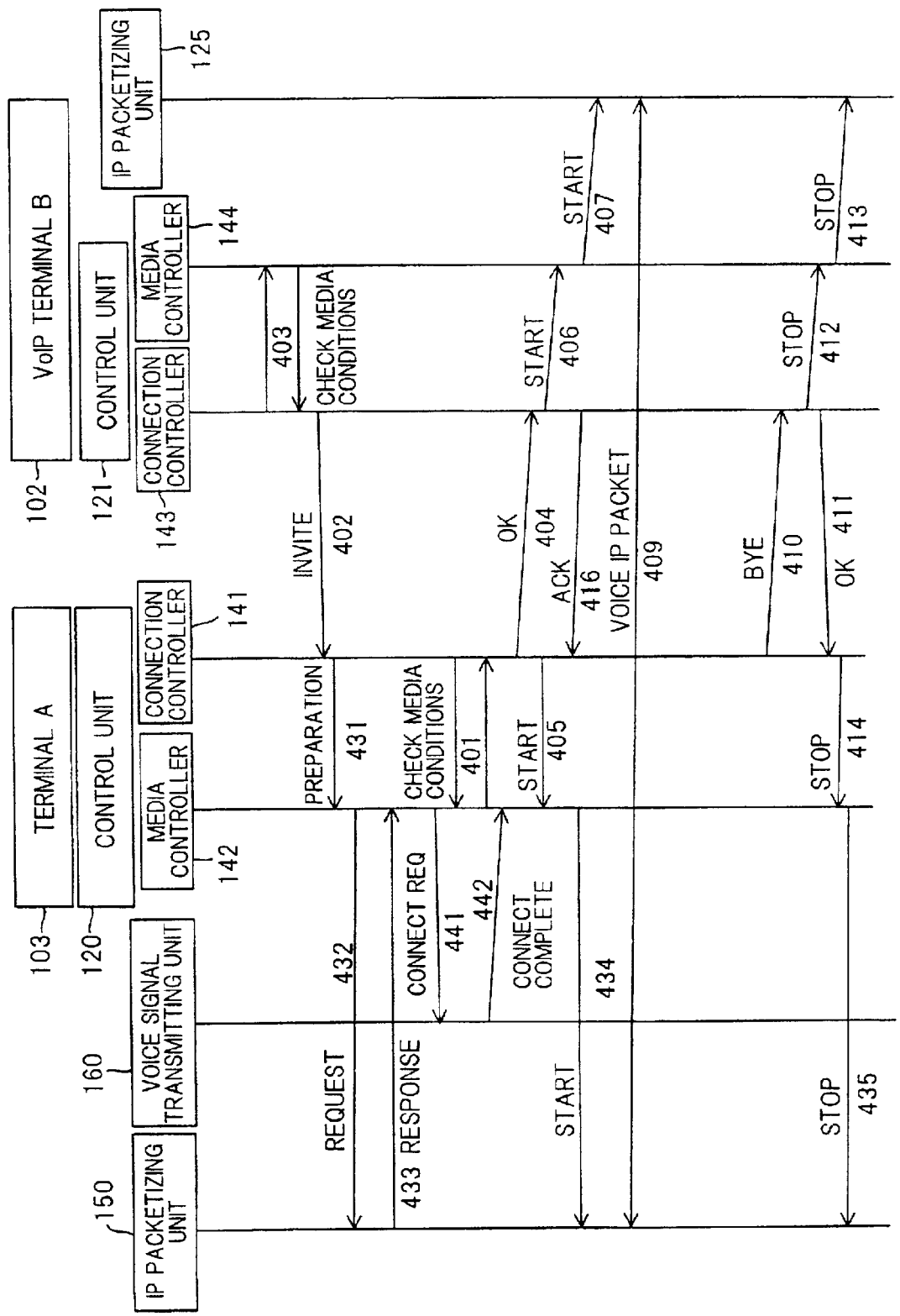
FIG. 8 shows a VoIP call connection sequence (in case of SIP) at the time of an incoming call.

A case in which terminal 103 originates a call has been described. The procedure when an incoming call arrives at terminal 103 from terminal 102 is executed in similar fashion; the sequence diagrams are illustrated in FIGS. 7 and 8. However, FIG. 7 shows the connection sequence for a VoIP call at the time of an incoming call in the case of the H.323 protocol and FIG. 8 the connection sequence for a VoIP call at the time of an incoming call in the case of SIP.

In the first embodiment, there is no limitation regarding a specific network used as the public telephone network. However, a third-generation mobile network currently under consideration can be applied as the network on the side of terminal A. Such a mobile network has both an IP communication function and a voice communication function and can be implemented in an efficient manner.

(C) Second Embodiment

According to a second embodiment of the present invention, a media gateway serving as an IP packetizing unit is placed in a public telephone network and voice is transmitted up to the media gateway without being packetized using an existing network. The overall construction of this embodiment is the same as that of the first embodiment shown in FIG. 1.

(a) Construction of Media Signal Transmitting Unit

FIG. 9 is a block diagram illustrating the second embodiment, in which the media gateway is placed in the public telephone network as the IP packetizing unit. Components in FIG. 9 identical with those of the first embodiment shown in FIG. 2 are designated by like reference characters. The voice signal transmitting unit 160, which exemplifies media signal transmitting means, includes the telephone switch 170 constituting a public telephone network; the telephone 163, which is connected to the switch 170; the telephone controller 165 for controlling the telephone 163; some of the functions of the media gateway (MG) 171, which is connected to the switch 170; and the media gateway controller (MGC) 172.

The media gateway 171 has both a function for interfacing the public telephone network and a function for interfacing an IP network. More specifically, the media gateway 171 has a plurality of lines connected to the telephone switch 170 and receives a voice signal from the telephone switch 170 via a line specified by the media gateway controller 172. The media gateway 171 packetizes this voice signal, transmits the voice IP packet in the direction of the destination terminal 102, converts a voice IP packet, which has been acquired from the IP network 130, to a voice signal and sends this voice signal to the side of terminal 103 via this line.

The media gateway controller 172 controls the media gateway 171 in accordance with a predetermined protocol (the Megaco protocol, which is a protocol compliant with ITU-T Recommendation H.248), and controls connection by exchanging call control signals with the public telephone network by a predetermined signaling system, e.g., Common Channel Signaling System No. 7. For example, if the telephone number of telephone 163 and the line number of media gateway 171 are specified by a call control signal from the media gateway controller 172 to request the telephone switch 170 for a connection, the telephone switch 170 connects the telephone 163 with the media gateway 171.

The control unit 120 of terminal 103 is capable of communicating with the media gateway controller 172 via the IP network 130. As will be set forth in the connection sequence described below, the telephone 163 in the voice signal transmitting unit 160 and the media gateway 171 are connected by an exchange of control signals between the media gateway controller 172 and control unit 120. Further, in a manner to the first embodiment, the control unit 120 of terminal 103 is connected directly to the telephone controller 165 so that it can control the telephone 163. The voice/signal converter 122 is connected to the telephone 163 and can send and receive voice signals to and from the media gateway 171 via the telephone switch 170.

(b) Connection Sequence

Figure 10:
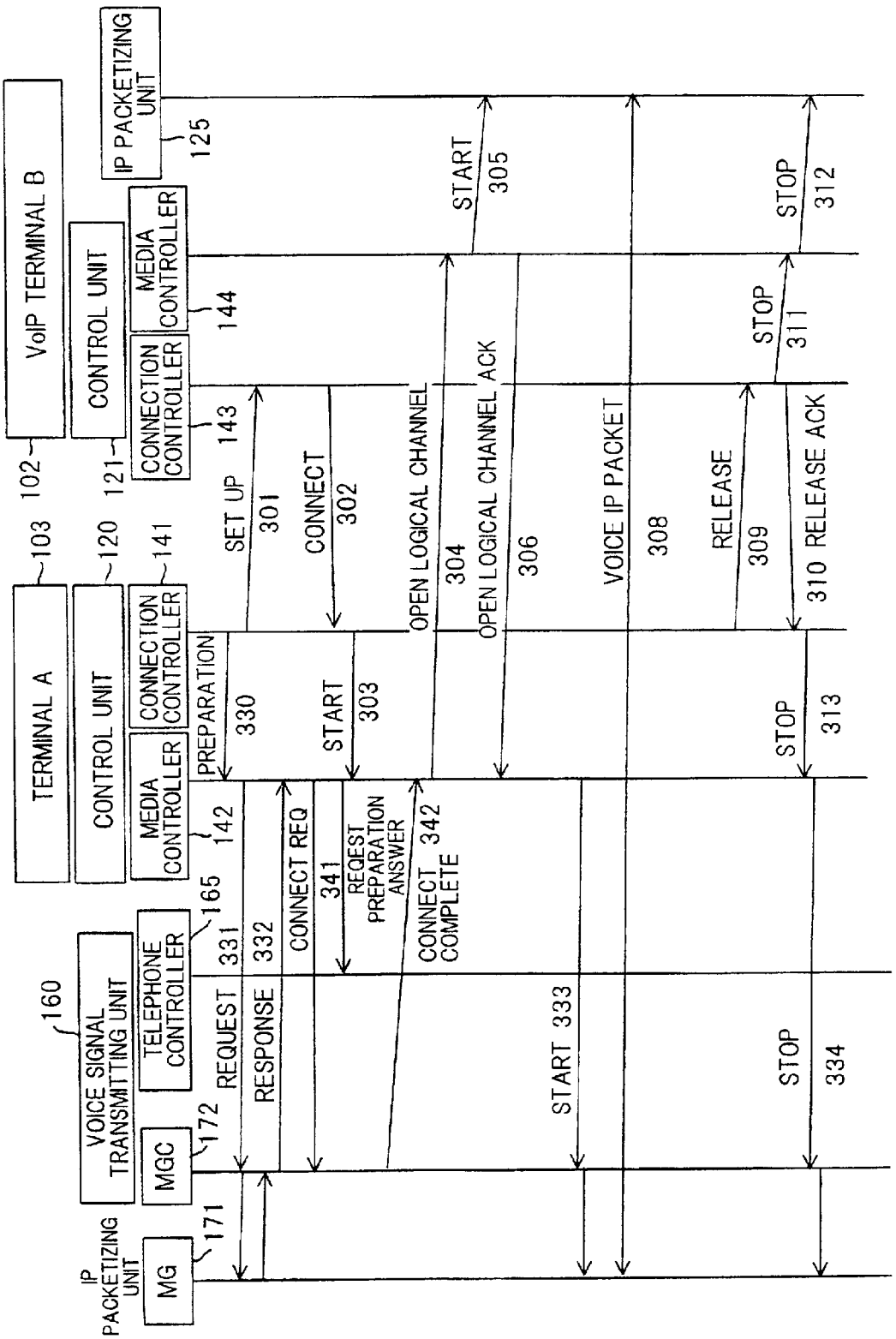
FIG. 10 shows a VoIP call connection procedure for a case where an IP packetizing unit (media gateway) is disposed within a public network.
Figure 11:
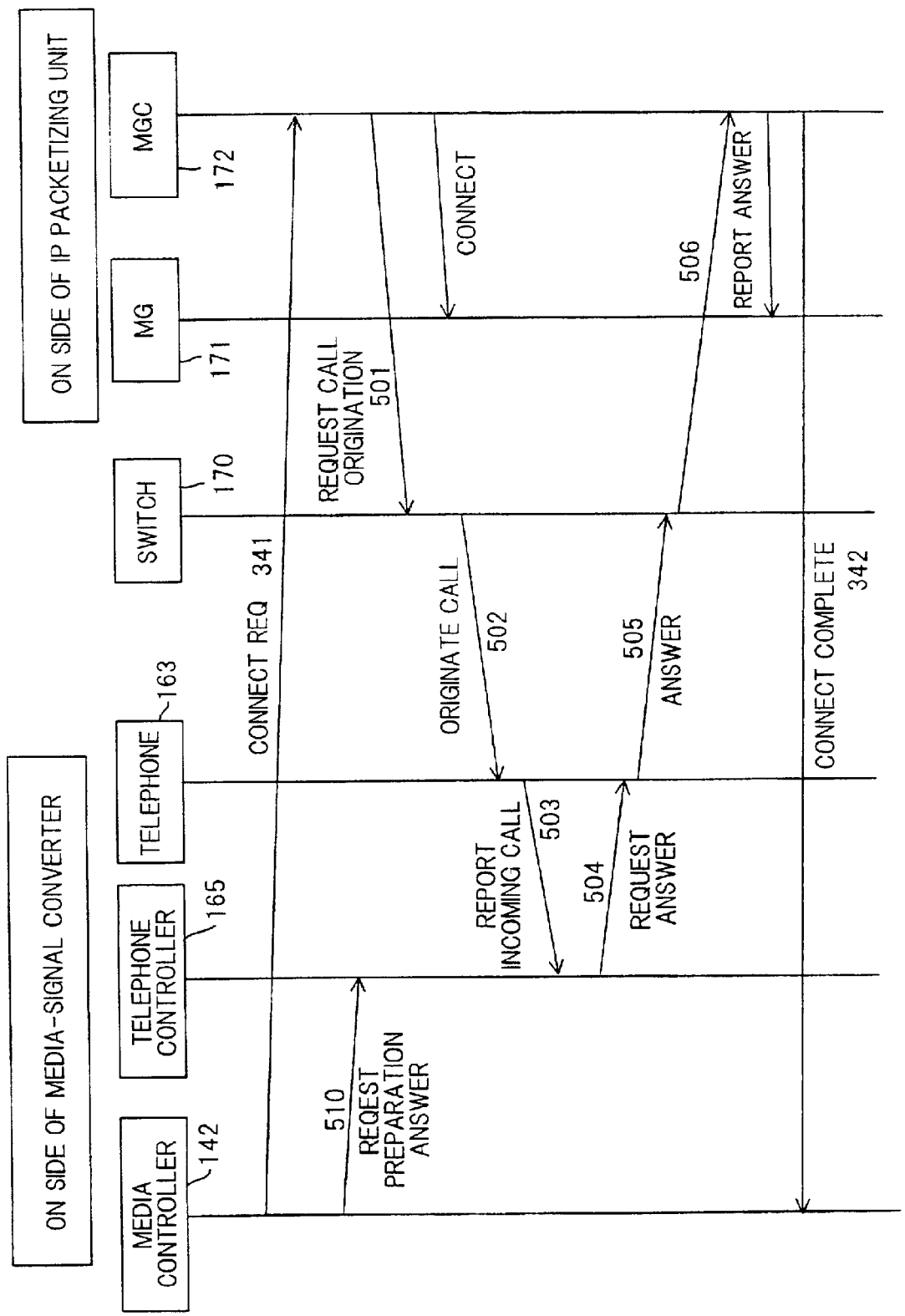
FIG. 11 shows a sequence for connecting a voice/signal converter and a media gateway.

In the second embodiment, the construction of the voice signal transmitting unit 160 differs from that of the first embodiment and, hence, the corresponding portion of the connection sequence also differs. FIG. 10 illustrates the VoIP call connection sequence according to the second embodiment, and FIG. 11 shows a connection sequence for connecting the voice/signal converter 122 and the media gateway 171.

1. Phase S: Media Connection Setup

As in the first embodiment, the connection controller 141 orders the media controller 142 to make preparations for media communication before a call is established (Preparation 330).

Upon being so ordered, the media controller 142 requests the media gateway 171 via the IP network and media gateway controller 172 to convert the voice signal to an IP packet (Request 331). In response to this request, the media gateway 171 sends back, to the media gateway controller 172, the necessary information such as the IP address and port number of the packetizing unit that performs the IP packetizing, and the encoding scheme used when the voice signal is IP-packetized. The media gateway controller 172 reports this information to the media controller 142 via the IP network (Response 332)

Next, the media controller 142 controls the voice signal transmitting unit 160 to connect the voice/signal converter 122 and the media gateway 171 (341).

More specifically, as shown in FIG. 11, the media controller 142 notifies the media gateway controller 172 of the telephone number of the telephone 163 connected to the voice/signal converter 122 and requests that a call be originated to this number (Connect Req. 341). Further, the media controller 142 requests the telephone controller 165 of telephone 163 on the side of the voice/signal converter to answer if there is an incoming call (answer preparation message 510). If an origination request is issued, the media gateway controller 172 requests the telephone switch 170 to connect the media gateway 171 to the specified telephone 163 via a predetermined line by a call control signal (501). As a result, an incoming call arrives at the telephone 163 via the public telephone network (502, 503). When the incoming call arrives, the telephone controller 165 responds by completing the connection (504). An answer signal is sent from the telephone switch 170 to the media gateway controller 172 (505, 506). Upon receiving the answer signal, the media gateway controller 172 notifies the media gateway 171 of completion of the connection to the public telephone network and completes the connection. The media gateway controller 172 thenceforth sends the media controller 142 a Connect Complete message 342 indicative of completion of the connection.

2. Phase A: Call Setup Phase

Phase A is exactly the same as Phase A of the first embodiment and need not be described again.

3. Phase B: Initial Communication and Capability Exchange

Phase B is exactly the same as Phase B of the first embodiment and need not be described again.

4. Phase C: Establishment of Audiovisual Communication

The media controllers 142, 144 of both VoIP terminals A and B notify the IP packetizing unit (media gateway MG) 171 and the IP packetizing unit 125, respectively, of the destination IP addresses and port numbers, which are indicative of the destination to which the voice packet is to be transmitted, acquired through the above-described procedure, and the IP packetizing units 171, 125 start sending the voice IP packet using the reported IP address and port number as the destination. Start messages (305, 333) in FIG. 10 correspond to these parts of the procedure. In this case, the media controller 142 transmits the Start message 333 to the media gateway controller 172, which controls the media gateway 171, via the IP network. In response, the media gateway controller 172 sets the IP address and port number of terminal B in the media gateway 171 to thereby make voice communication possible.

A voice IP packet sent from the media gateway 171 arrives at the IP interface 129 (FIG. 1), which has the set IP address of the communicating terminal, via the IP network 130. The voice IP packet enters the IP packetizing unit 125 having the specified port number and is converted to a voice signal by the IP packetizing unit 125. The voice/signal converter 123 converts the voice signal to voice and outputs the same. The voice signal in the opposite direction is transmitted in a similar manner, whereby voice communication becomes possible (voice packets are sent and received at 308).

5. Phase D: Call Service

By changing the IP address of the communicating party to another IP address during communication in response to a request issued to the media gateway controller 172, it is possible with the voice communication established in Phase B to change the destination of the connection. Services such as third-party conversation and call transfer are implemented using this function.

6. Phase E: Call Termination

In order to release a connected call, the connection controller 141 of the terminal 103 sends the release request message Release (309) and instructs the media gateway 171 to stop the sending of voice (313, 314). Upon receiving the release request message, the connection controller 143 of terminal B at the destination instructs the IP packetizing unit 125 to halt the sending of voice (311, 312) and sends the connection controller 141 of terminal A the message Release Ack to answer the release request (310). As a result, the resources that were being used in the connection of the call are released and the call can be disconnected. If the terminal 102 that requested release cannot receive Release Ack 310 within a fixed period of time, this terminal resends the release request message. This makes it possible to release the call connection reliably even in cases where the message has been lost. After the call is released, the media signal transmitting unit connected in Phase S is released. This is carried out by sending a disconnect request message from the control unit of terminal 103 to the media gateway 171 and telephone controller 165. In a case where the control unit of terminal A continues with the connection of another call, the procedure from Phase A onward is executed without effecting release, thereby making it possible to connect the other call.

As mentioned above, the Megaco protocol (H.248 protocol) has been defined as means by which the media gateway controller 172 controls the media gateway 171. In accordance with this protocol, it is possible (1) to specify the IP address and port number of the party that is communicating with the media gateway 171, (2) to acquire the IP address and port number used by the media gateway 171, to set up a line connected to the switch, and (4) to IP-packetize a voice signal received for the line that has been set up.

(c) Modification of Second Embodiment

FIG. 12 is a block diagram illustrating a modification of the second embodiment. Components in FIG. 12 identical with those of the second embodiment shown in FIG. 9 are designated by like reference characters.

As mentioned above, the Megaco protocol is a protocol as means by which the media gateway controller 172 controls the media gateway 171. Accordingly, as shown in FIG. 12, the media controller 142 of terminal A is provided with an MGC control function 142' and the elements from the telephone 163 on the side of terminal A to the media gateway (MG) 171 are regarded as one virtual media gateway 200. If this arrangement is adopted, the media controller 142 can control the virtual media gateway 200 as a higher order MGC by the Megaco protocol.

By virtue of this arrangement, the control unit 120 of terminal 103 need not use a new protocol and can exercise control using the already defined H.248 protocol (Megaco protocol).

(D) Third Embodiment

FIG. 13A is a block diagram illustrating a media communication system according to a third embodiment in which the IP packetizing means is placed in a RAN (Radio Access Network). Components in FIG. 13A identical with those of the first embodiment shown in FIG. 1 are designated by like reference characters. This embodiment differs in that a mobile communication network is used as the network that accesses the IP network 130, and in that a mobile terminal is used as the terminal A. More specifically, the media communication system of the third embodiment has a mobile communication network 180 as the network for accessing the IP network 130, has a mobile terminal 104 as the terminal A, and has wireless means for mobile communication as means for transmitting voice signals. The wireless means for mobile communication is constituted by a base-station facility or the like including a radio transceiver, which is for modulating and demodulating radio signals from the mobile terminal 104, and a radio base station 181. The media communication system according to the third embodiment has the IP packetizing unit 150 placed in the mobile communication network 180. The IP packetizing unit 150 is connected to the radio base station 181 to exchange voice signals with the voice/signal converter 122 of the mobile terminal 104, and is connected to the IP network 130 via the IP interface 151 to exchange IP packets. An SGSN/GGSN 182 having a gateway function for a 3GPP core network is disposed between the radio base station 181 and the IP network 130.

Communication of control signals for connecting ordinary telephone calls and data calls is performed between the mobile terminal 104 and radio base station 181 (IP packetizing unit 150). The mobile terminal 104 and the IP packetizing unit 150 use these control signal communication means to communicate with each other and exchange control information through a sequence similar to these of the first and second embodiments. In this case, the radio base station 181 is capable of connecting the voice/signal converter 122 and IP packetizing unit 150 by a voice channel in the same manner as that of an ordinary voice call. By transmitting a control signal from the control unit 120 of mobile terminal 104 to the radio base station 181 (IP packetizing unit 150), the connection can be changed over freely. This makes it possible to raise the degree of freedom of connections.

In the case described above, a control signal from the mobile station is sent to the IP packetizing unit 150 via the radio base station 181. However, it can also be so arranged that a control signal is sent to the IP packetizing unit 150 via the IP network.

Further, if the IP network is classified as an asynchronous communication network and the mobile network as a synchronous communication network, then the signal conversion apparatus 155 will be provided in the base-station facility and connected to the asynchronous IP network 130, as depicted in FIG. 13B. The signal conversion apparatus 155 comprises: (1) first conversion means 150a for converting a synchronous voice signal, which the radio base station 181 has received from the mobile terminal 104 via a radio channel, to an asynchronous voice signal of a destination; (2) sending means (IP interface) 151 for sending the asynchronous voice signal obtained by the conversion to the asynchronous communication network 130; (3) second conversion means 150b for receiving an asynchronous voice signal from the asynchronous communication network 130 and converting this signal to a synchronous voice signal; and (4) a transceiver unit 150c for transmitting the synchronous voice signal obtained by the conversion to the radio base station 181 in such a manner that this signal will be transmitted to the mobile station 104 via the radio channel.

Modification

As shown in FIG. 9, the media gateway (MG) 171 is provided as the IP packetizing unit 130 and IP interface 151 in FIG. 13A, and the media gateway controller (MGC) 172 is provided as the control means of the media gateway 171. The voice connection from the mobile terminal 104 to the media gateway MG is established via the radio base station 181, and control of the media gateway MG is exercised by the media gateway controller MGC in accordance with a command from the mobile terminal 104.

If the mobile terminal 104 is provided with the MGC control function in this case, the elements from the voice/signal converter 122 of the mobile terminal to the media gateway MG disposed in the mobile network can be regarded as one virtual gateway. If this arrangement is adopted, the mobile terminal 104 can control the virtual media gateway MG utilizing a protocol (Megaco protocol) the same as that which the media gateway controller MGC uses to control the media gateway MG.

(E) Fourth Embodiment

FIG. 14 is a block diagram illustrating a fourth embodiment in which a private VoIP network is accessed from the outside. Components in FIG. 14 identical with those of the first embodiment shown in FIG. 1 are designated by like reference characters.

This is a communication system in which a closed private IP media communication network (private VoIP network) 190 is constructed in a corporation or business and is connected to the external public IP network 130 via a firewall 191. In this communication system, the control unit 120 of the external terminal 103 is capable of VoIP communication with the terminal 102 of the intracorporate IP network 190 via the public IP network 130 and firewall 191. Often, however, transmitting a VoIP voice packet through a public IP network and firewall is not realistic because of problems relating to IP communication speed and firewall speed.

According to the fourth embodiment, this communication system is adapted in such a manner that the external terminal 103 can communicate media with the internal terminal 102 directly via the intracorporate IP network 190 without the intervention of the firewall 191. To achieve this, the IP packetizing unit 150 is connected to the private VoIP network (intracorporate IP network) 190 via the IP interface 151, the IP packetizing unit 150 and the voice/signal converter 122 of the external terminal 103 are connected by the voice signal transmitting unit 160, and voice signals can be sent and received in both directions. An ordinary public telephone network can be used as means for implementing the voice signal transmitting unit 160, as in the first embodiment of FIG. 2, and the connection sequence is the same as that of the first embodiment. A mobile communication network can also be used as alternate means for implementing the voice signal transmitting unit 160, as in the third embodiment of FIG. 13A.

The control unit 120 of the external terminal 103 performs control via the IP network 130, firewall 191 and intracorporate IP network 190 in such a manner that the IP packetizing unit 150 operates as its own IP packetizing unit when a call is generated, and connects the voice signal transmitting unit 160 in such a manner that the internal voice/signal converter 122 and IP packetizing unit 150 are connected. Upon completion of connection control, the control unit 120 of external terminal 103 sends and receives voice signals to and from the internal terminal 102 via the voice/signal converter 122, voice signal transmitting unit 160, IP packetizing unit 150 and intracorporate IP network 190.

As a result, the external terminal 103 can send voice signals using the intracorporate IP network 190 just as if it were connected directly to the intracorporate IP network 190, without the intervention of the firewall 191.

(F) Fifth Embodiment

FIG. 15 is a block diagram illustrating a fifth embodiment in which the firewall is bypassed.

In this communication system in which the intracorporate IP network (intranet) 196 is connected to the public IP network 130 via the firewall 195, the VoIP terminal 101, which is connected to the intracorporate IP network 196, is capable of VoIP communication with the VoIP terminal 102 via the intracorporate IP network 196, firewall 195 and IP network 130.

In general, when the intracorporate IP network 196 and public IP network 130 are connected, the connection is made through the firewall 195 in order to assure security, all IP packets are checked at the firewall to determine whether or not they should pass, and security is safeguarded in such a manner that inappropriate IP communication will not take place. With VoIP communication, however, 10 to 50 IP packets are transferred in one second. Transfer of a large number of IP packets leads to a greater amount of processing at the firewall and considerable firewall resources are consumed in order to execute this processing. Voice IP packets in VoIP communication, on the other hand, contain only voice information and it is therefore unnecessary to subject each and every voice IP packet to stringent scrutiny to determine whether the packet should pass or not.

According to the fifth embodiment, therefore, IP-packet relay means 197 is provided in parallel with the firewall 195 and a voice IP packet is communicated via the IP-packet relay means 197 after connection negotiation control is performed between the terminals 101 and 102. If this expedient is adopted, it can be so arranged that the voice IP packet will not traverse the firewall 195. This makes it possible to reduce the amount of processing at the firewall.

When a call is generated, the VoIP terminal 101 communicates with the IP-packet relay means 197 via the intracorporate IP network 196 firewall 195 and public IP network 130 and performs control in such a manner that the IP-packet relay means 197 operates as its own IP-packet relay means. Further, the terminal 101 controls connection in such a manner that the voice/signal converter 122 can send a voice signal to the terminal 102 via the intracorporate IP network 196, IP-packet relay means 197 and public IP network 130. Upon completion of the connection, the voice signal output from the voice/signal converter 122 is IP-packetized by the IP packetizing unit 124 and sends the packet to the VoIP terminal 102 via the intracorporate IP network 196, IP-packet relay means 197 and public IP network 130.

Though the media signal is described as being a voice signal, the present invention is not limited to a voice signal and can be applied to signals such as an image signal and signal that is a combination of voice and images.

Thus, in accordance with the present invention, terminals can be connected via an IP network to communicate the media signal even if the media signal is not IP-packetized completely overall segments of the communication path between the terminals.

Further, in accordance with the present invention, the IP-packetizing of voice is not performed in a terminal but in an apparatus disposed in close proximity to the IP network. This makes it possible to perform VoIP communication with little decline in voice quality. Moreover, it is possible to carry out end-to-end control, which is one of the merits of VoIP communication, thereby enabling the provision of flexible service.

Further, in accordance with the present invention, even if there is a segment of the communication path that does not have sufficient data transmission bandwidth, e.g., a wireless segment, voice is transmitted over this segment as is without being converted to a voice IP packet. As a result, delay of IP packets can be reduced and a decline in voice quality can be avoided. In addition, since delay of IP packets can be reduced, the size of overhead in the header of an IP packet does not present a problem and it is possible to dispense with a highly sophisticated header compression function.

Further, in accordance with the present invention, it is possible to provide a terminal apparatus and a signal conversion apparatus that are capable of communicating media.

Further, in accordance with the present invention, voice is transmitted as is using a public network or mobile network without relying upon IP packetizing over segments that do not possess sufficient data transmission bandwidth. As a result, facilities such as an existing voice telephone network can be utilized effectively. This is extremely advantageous to communication companies and users.

Further, in accordance with the present invention, a terminal can be provided with an interface exactly the same as that of the conventional VoIP terminal. As a result, the terminal on the side of the communicating party can set up calls and provide service through handling that is exactly the same without distinguishing between the terminal of the invention and a VoIP terminal of the prior art.

Further, in accordance with the present invention, it is possible for a business equipped with a private VoIP network having a VoIP-based extension to communicate just as if a connection has been made directly to the extension from the outside using an existing telephone network. This makes possible the implementation of highly effective means for use as intracorporate communication means.

Further, in accordance with the present invention, it is possible to dispense with processing for verifying voice IP packets at the firewall. This makes it possible to reduce the amount of firewall processing, to dispense with the need to provide the firewall with sophisticated functionality and to hold down cost.

As many apparently widely different embodiments of the present invention can be made without departing from the concept and scope thereof, it is to be understood that the invention is not limited to the specific embodiments thereof except as defined in the appended claims.

What is claimed is:

1. A media communication system for performing media communication between first and second terminals, each of which is constructed so as to be capable of IP communication, via an IP network, comprising:

a terminal as the first terminal having a media/signal converter for generating and sending a media signal and receiving a media signal, and a controller for controlling connection to the second terminal and for controlling sending/receiving of a media signal when a call is generated;

an IP packetizing unit for IP-packetizing and sending, to the IP network, a media signal sent from the first terminal, and for converting an IP packet received from the IP network to a media signal and sending the media signal to the first terminal; and a media signal transmitting unit for connecting said media/signal converter, which is provided within the first terminal, to said IP packetizing unit, and for transmitting a media signal between said media signal converter and said IP packetizing unit, wherein when the controller of said first terminal performs connection control by generation of a call, said controller communicates with said IP packetizing unit to acquire an IP address and port number of said IP packetizing unit, reports this IP address and port number to the second terminal, receives an IP address and port number of the second terminal from the second terminal and reports these to said IP packetizing unit, and said controller controls the media signal transmitting unit to connect said media signal converter and said IP packetizing unit, said IP packetizing unit packetizes a media signal received from the media/signal converter via said media signal transmitting unit and sends the resulting packet to the IP network using the IP address and port number of the second terminal as the destination, and the second terminal sends a media-signal IP packet to the IP network using the IP address and port number of said IP packetizing unit as the destination and said IP packetizing unit converts the IP packet received from the IP network to a media signal and sends the media signal to said media/signal converter via the media signal transmitting unit.

2. A media communication system for performing media communication between first and second terminals, each of which is constructed so as to be capable of IP communication, via an IP network, comprising:

an IP packetizing unit for IP-packetizing and sending, to the IP network, a media signal sent from the first terminal, and for converting an IP packet received from the IP network to a media signal and sending the media signal to the first terminal;

a media signal transmitting unit for connecting a media/signal converter, which is provided within the first terminal, to said IP packetizing unit, and for transmitting a media signal; and the first terminal having, in addition to said media/signal converter for generating a media signal and receiving a media signal from the IP packetizing unit, a controller for controlling connection to the second terminal and for controlling sending/receiving of a media signal when a call is generated, wherein when a call is generated, the first terminal performs control in such a manner that said IP packetizing unit operates as its own IP packetizing unit, and controls said media signal transmitting unit to connect said media/signal converter and said IP packetizing unit, upon completion of the connection, the first terminal sends and receives media signals to and from the second terminal via said media/signal converter, said media signal transmitting unit, said IP packetizing unit and said IP network, and wherein when the controller of said first terminal performs connection control, said controller communicates with said IP packetizing unit to acquire an IP address and port number of said IP packetizing unit, reports this IP address and port number to the second terminal and receives an IP address and port number of the second terminal from the second terminal and reports these to said IP packetizing unit;

said IP packetizing unit packetizes a media signal received from the media/signal converter via said media signal transmitting unit and sends the resulting packet to the IP network using the IP address and port number of the second terminal as the destination; and the second terminal sends a media-signal IP packet to the IP network using the IP address and port number of said IP packetizing unit as the destination.

3. The system according to claim 2, wherein said media signal transmitting unit is constructed using a mobile communication network, said IP packetizing unit is provided within the mobile communication network and communication between the first terminal and said IP packetizing unit is implemented in accordance with a wireless-access communication protocol.

4. The system according to claim 3, wherein said IP packetizing unit provided within said mobile communication network is constituted by a media gateway and a media gateway controller is provided for communicating with the controller of the first terminal to control said media gateway by a predetermined protocol.

5. The system according to claim 4, wherein the controller of said first terminal is provided with a function of said media gateway controller, and said controller regards said media gateway and said media gateway controller as one virtual media gateway and controls his virtual media gateway by said protocol.

* * * * *